US012269426B2

(12) United States Patent
Demonte

(10) Patent No.: US 12,269,426 B2
(45) Date of Patent: Apr. 8, 2025

(54) TRANSPORTABLE PERSONAL ELEVATION DEVICE FOR VEHICLE, CLIMBING ASSIST KIT, AND METHODS OF USING SAME

(71) Applicant: Walter Peter Demonte, Maidstone (CA)

(72) Inventor: Walter Peter Demonte, Maidstone (CA)

(73) Assignee: Walter Peter DeMonte, Maidstone (CA)

( * ) Notice: Subject to any disclaimer, the term of this patent is extended or adjusted under 35 U.S.C. 154(b) by 283 days.

(21) Appl. No.: 17/860,557

(22) Filed: Jul. 8, 2022

(65) Prior Publication Data

US 2023/0079517 A1 Mar. 16, 2023

Related U.S. Application Data

(63) Continuation-in-part of application No. 17/370,583, filed on Jul. 8, 2021, now Pat. No. 11,794,656.

(60) Provisional application No. 63/049,669, filed on Jul. 9, 2020.

(51) Int. Cl.
*B60R 3/02* (2006.01)
*B60P 1/44* (2006.01)

(52) U.S. Cl.
CPC ............. *B60R 3/02* (2013.01); *B60P 1/4414* (2013.01)

(58) Field of Classification Search
CPC ................................. B60R 3/02; B60P 1/4414
See application file for complete search history.

(56) References Cited

U.S. PATENT DOCUMENTS

| | | | |
|---|---|---|---|
| 1,118,584 A | 11/1914 | Roebuck et al. | |
| 2,246,986 A | 6/1941 | Pellegrini | |
| 2,642,217 A | 6/1953 | Jennings | |
| 2,670,968 A | 3/1954 | Duffy | |
| 3,669,218 A * | 6/1972 | Hall | E06C 9/00 296/62 |
| 3,833,240 A | 9/1974 | Weiler | |
| 4,093,257 A | 6/1978 | Tarvin | |
| 4,860,854 A | 8/1989 | Lodholz, Jr. | |
| 5,312,150 A | 5/1994 | Quam | |
| 7,025,174 B1 | 4/2006 | Hawley | |
| 7,870,932 B2 * | 1/2011 | Lapke | E06C 5/02 182/86 |

(Continued)

*Primary Examiner* — Bryan A Evans
(74) *Attorney, Agent, or Firm* — Carrier, Shende & Associates P.C.; Joseph P. Carrier; Fulchand P. Shende

(57) ABSTRACT

A transportable personal elevation device is attachable to a substrate which is a vehicle or trailer bed. The elevation device includes a platform assembly including a platform and a platform support member. The elevation device also includes a connector assembly including a pivot pin and a mounting structure. The connector assembly is configured and arranged such that when attached to the substrate, the elevation device can be pivotally moved about the pivot pin between a storage position and an outwardly extending position. The elevation device may also include a latch assembly for temporarily fixing a position of the device, and may further include a post which is attached to a side of the platform assembly to permit grasping thereof by a user. The elevation device may take the form of a pivotable stair assembly, or alternatively, may include a power-assisted platform which can be selectively raised and lowered.

7 Claims, 35 Drawing Sheets

(56) References Cited

U.S. PATENT DOCUMENTS

| | | | | |
|---|---|---|---|---|
| 8,640,826 B1* | 2/2014 | Beilstein | ................. | E06C 7/182 |
| | | | | 182/127 |
| 11,053,736 B1* | 7/2021 | Becker | ..................... | E06C 5/40 |
| 2007/0273123 A1* | 11/2007 | Wilson | ..................... | B60R 3/02 |
| | | | | 280/166 |

* cited by examiner

FIG. 8
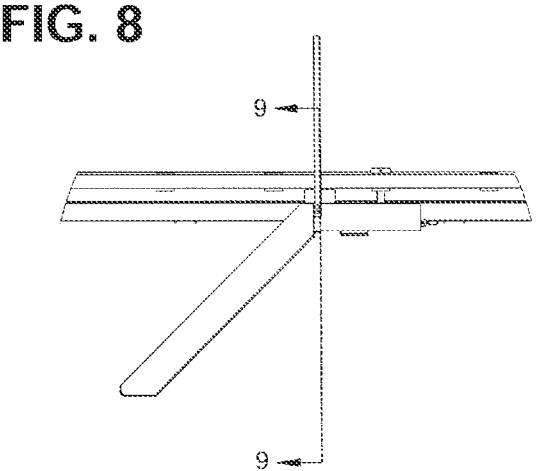
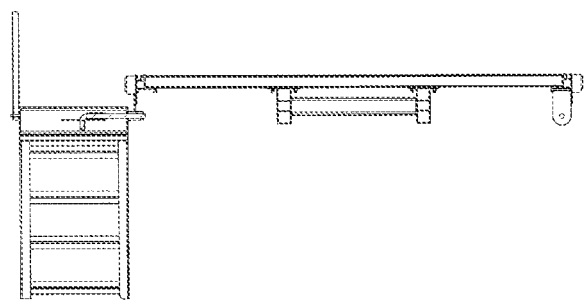
FIG. 9

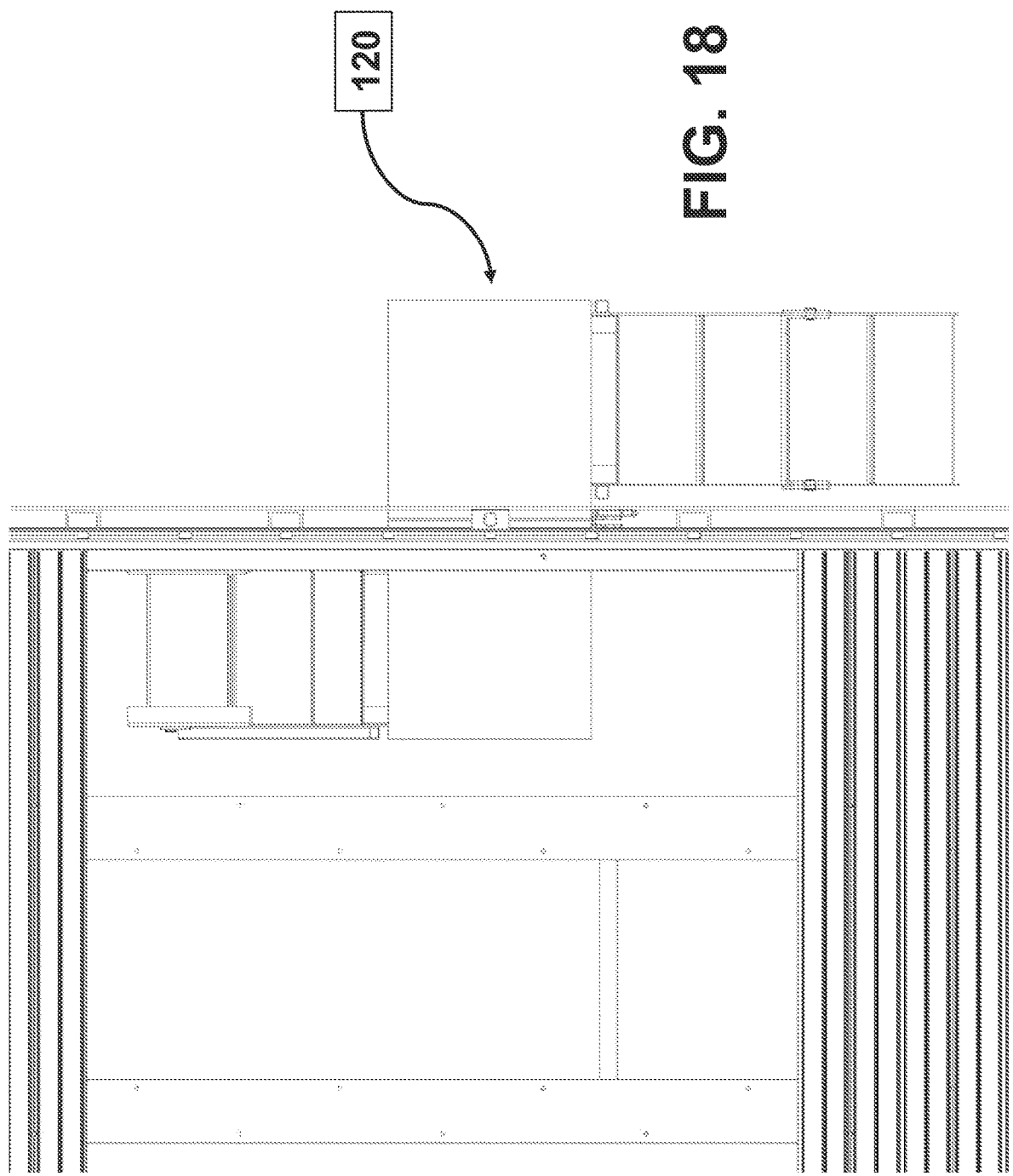

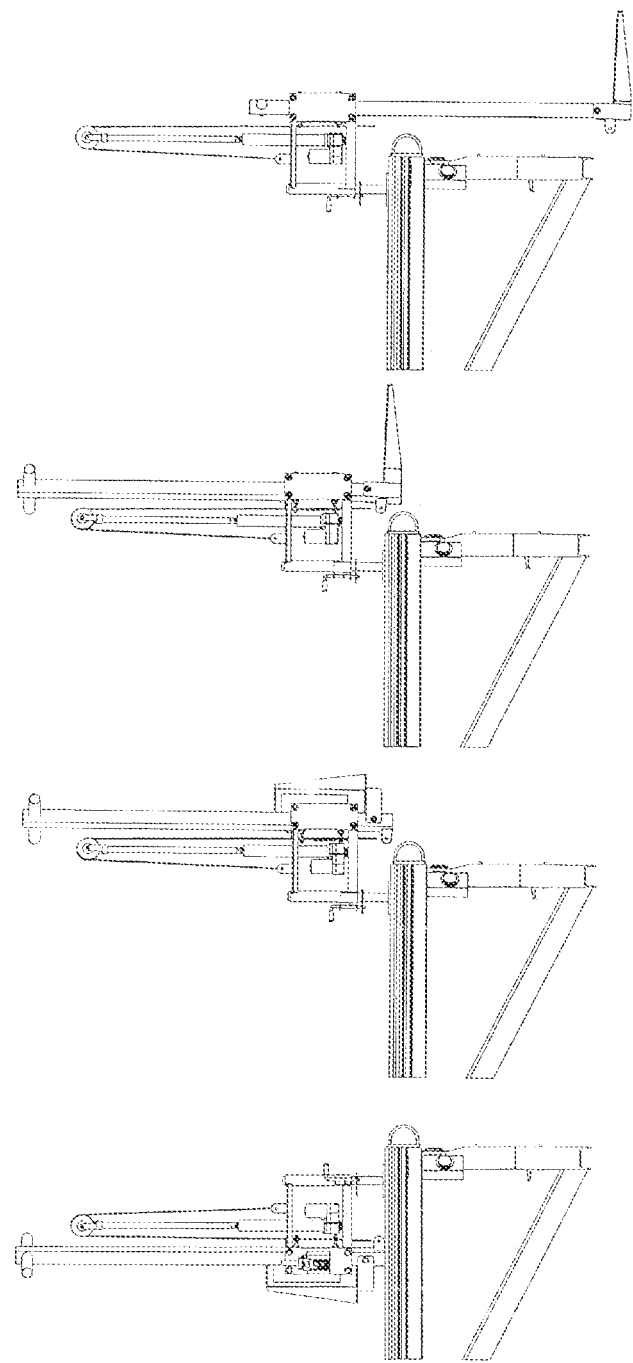

325

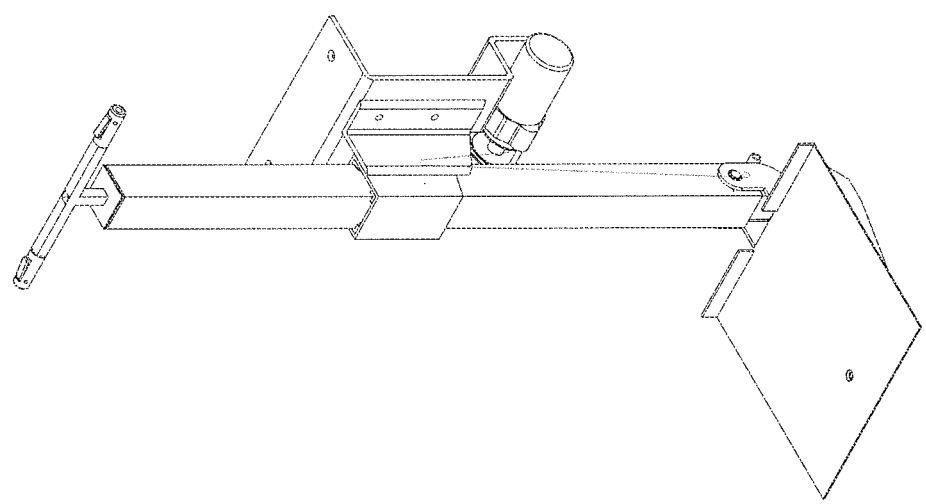
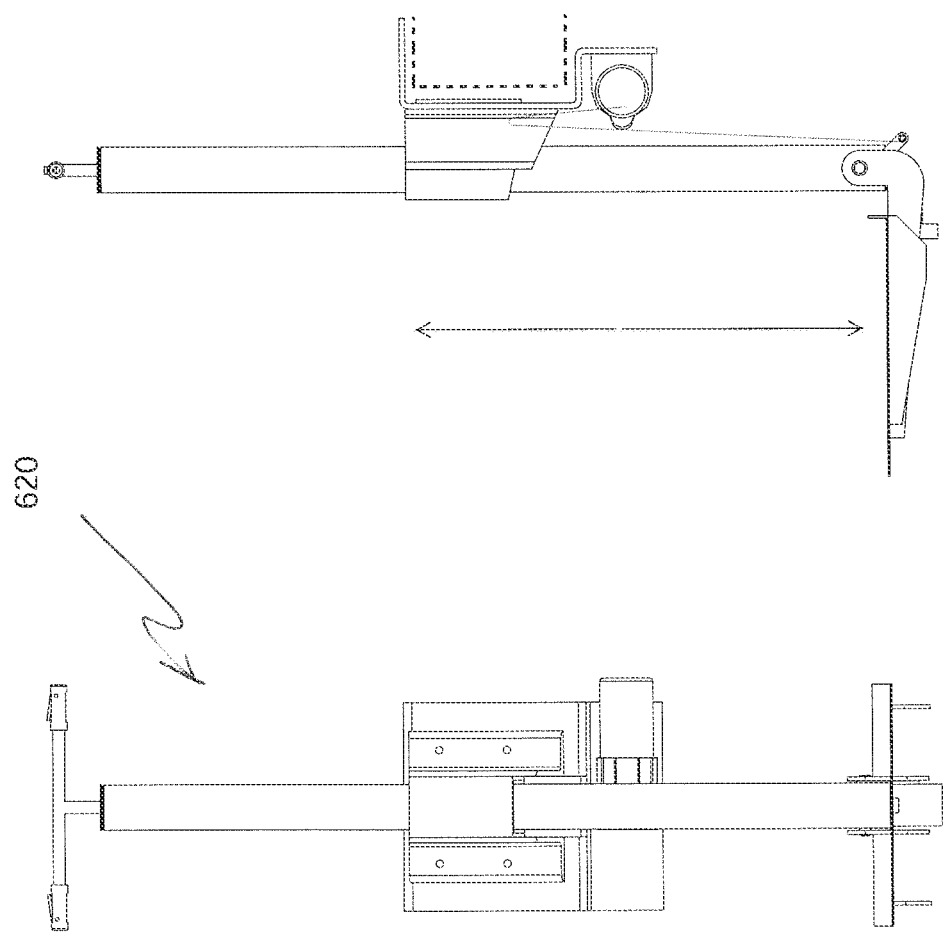
FIG-31C
FIG-31B
FIG-31A

TRANSPORTABLE PERSONAL ELEVATION DEVICE FOR VEHICLE, CLIMBING ASSIST KIT, AND METHODS OF USING SAME

CROSS-REFERENCE TO RELATED APPLICATION

This application is a continuation-in-part of, and claims priority from U.S. patent application Ser. No. 17/370,583, filed Jul. 8, 2021 (Now U.S. Pat. No. 11,794,656), which, in turn, claimed priority from U.S. Provisional Patent Application No. 63/049,669, filed Jul. 9, 2020. The entire contents of each of the referenced priority applications are incorporated herein by reference.

BACKGROUND OF THE INVENTION

Field of the Invention

The present invention relates to a transportable personal elevation device, for attaching to a vehicle or trailer, to an assembly kit for building such elevation device, and to methods of using same. In one embodiment, the elevation device may take the form of a stowable stair structure. In another embodiment, the device includes a power-assisted platform which can be selectively raised and lowered.

More particularly, the present invention relates to a transportable personal elevation apparatus which is particularly suited to be used with an over-the-road semi trailer and which is configured to be permanently or semi-permanently attached to the trailer bed, where the apparatus selectively enables a user to climb, or be lifted up on to a bed of the vehicle or trailer. The present invention also relates to related kits and methods.

Description of the Background Art

A number of different ladder and step assemblies are known for use with trucks and other vehicles. Examples of some of the known ladder and step assemblies include those described in U.S. Pat. Nos. 1,118,584, 2,246,986, 2,642,217, 2,670,968, 3,669,218, 3,833,240, 4,093,257, 4,860,854, 5,312,150, and 7,025,174.

Some truck drivers may have difficulty climbing up into the trailer of an over the road semi truck/trailer assembly, using known equipment provided at the back of the trailer, such as a small fixed ladder or the like. Such difficulty may be caused by age, disability or infirmity which may permit the driver to operate a truck, but which may impede or prevent climbing the known structures.

Although the known ladder and step assemblies are usable for their intended purposes, a need still exists in the art for a convenient transportable personal elevation device for a vehicle, and for method of using such an elevation device. In particular, there is a need for an improved transportable personal elevation device which is configured to be left in place on a truck trailer bed for an extended time period so as to be immediately usable when needed, to a kit which may be assembled to make such a transportable elevation device, and to a method of using such transportable elevation device.

SUMMARY OF THE INVENTION

Accordingly, it is an object of the present invention to provide a transportable personal elevation device which is configured to be left in place on a bed of a vehicle or trailer and which selectively enables a user to climb, or to be lifted up on to a bed of the vehicle or trailer, a kit which may be used to construct such a personal elevation device, and to methods of using such kit and elevation device.

A transportable personal elevation device according to a first illustrative embodiment of the present invention is configured for attaching to movable substrate which is a vehicle or trailer bed. The elevation device includes a platform assembly including a platform and a platform support member supporting the platform thereon.

The elevation device according to the first embodiment also includes a connector assembly for operatively connecting the platform assembly to the bed, the connector assembly comprising a pivot pin and a mounting structure.

The connector assembly is configured and arranged such that when the personal elevation device is attached to the substrate, the personal elevation device can be pivotally moved about the pivot pin between a storage position and an outwardly extending position.

Optionally, the elevation device according to the first embodiment may also include a latch assembly for temporarily fixing a position of the device.

Optionally, the elevation device according to the first embodiment may also include a post which is attached to a side of the platform assembly, to permit grasping thereof by a user.

The connector assembly may be configured to attach the elevation device to a pocket at an edge portion of the vehicle or trailer bed.

A transportable personal elevation device according to another embodiment of the invention is provided for attaching to a bed of a vehicle or trailer, and takes the form of a stair structure including an upper platform and a connector assembly for connecting the stair structure to the bed. The connector assembly includes a pivot pin, which extends along a substantially vertical axis, and associated mounting structure including a mounting bracket.

A pair of spaced apart side support plates are attached to the platform and extend downwardly therefrom at an angle, and a plurality of spaced-apart step members extend between the side supports and are oriented substantially parallel to one another.

The connector assembly is configured and arranged such that when the stair structure is attached to the bed, it can be rotated about the pivot pin, between a stored position below the bed and a deployed position which extends outwardly from an edge of the bed. The stair structure is supported at two areas of support in each of the stored and deployed positions.

A latch assembly is provided for temporarily locking a position of the assembly in either the storage position or the deployed position.

In additional embodiments of the present invention, a personal elevation device takes the form of a height-adjustable platform which can be moved between a stored position and a deployed position, where the platform is pivotally movable between a vertical storage position and a horizontal use position. The personal elevation devices according to these embodiments include a height adjustment mechanism which is operable to selectively raise or lower the platform in the horizontal use position thereof.

In a powered platform embodiment, a transportable powered personal elevator device is provided for either edge attachment or pivotal attachment to a trailer bed or to another suitable vehicle surface, by placing a pivot pin in a hollow support socket provided below the trailer bed. The powered personal elevator device according to this embodiment is supported on or below the trailer bed.

The powered personal elevator device includes a platform assembly with a platform for supporting a user thereon. The platform assembly also includes a platform support member supporting the platform thereon. The platform may be pivotally attached to the platform support member in such a way as to permit angular adjustment of the platform, such as raising it to be oriented vertically for storage, and the platform support member also permits vertical adjustment of the platform so that it can be selectively raised and lowered.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 8 is a side plan view of the assembled stair structure and trailer bed, with the stair structure shown in the deployed position.

FIG. 9 is an end plan view of the assembled stair structure and trailer bed, with the stair structure shown in the deployed position.

FIG. 18 is a top plan view of the stair structure according to the second embodiment of the present invention, shown attached to the trailer bed and depicted in both the deployed and storage positions thereof.

FIGS. 20A-19D are sequential top plan views of a rear portion of a semi truck trailer having the transportable personal elevation device according to the third embodiment of the present invention mounted thereon, where the sequence shows steps in operation of the device.

FIGS. 22A-22D are sequential side plan views of a rear portion of a semi truck trailer having the transportable personal elevation device according to the third embodiment of the present invention mounted thereon, where the sequence shows steps in operation of the device.

FIG. 31A is a front plan view of a transportable personal elevation device according to a sixth embodiment.

FIG. 31B is a side plan view of the transportable personal elevation device of FIG. 31A, also showing a portion of a semi truck trailer bed in phantom.

FIG. 31C is a perspective view of the transportable personal elevation device of FIGS. 31A-31B, where the device mountable on an edge portion of a trailer bed.

DETAILED DESCRIPTION

It should be understood that only structures and methodology needed for illustrating selected embodiments of the present invention are described herein. Other conventional structures, and those of ancillary and auxiliary components of the system, will be known and understood by those skilled in the art.

First Embodiment

Figure 1:
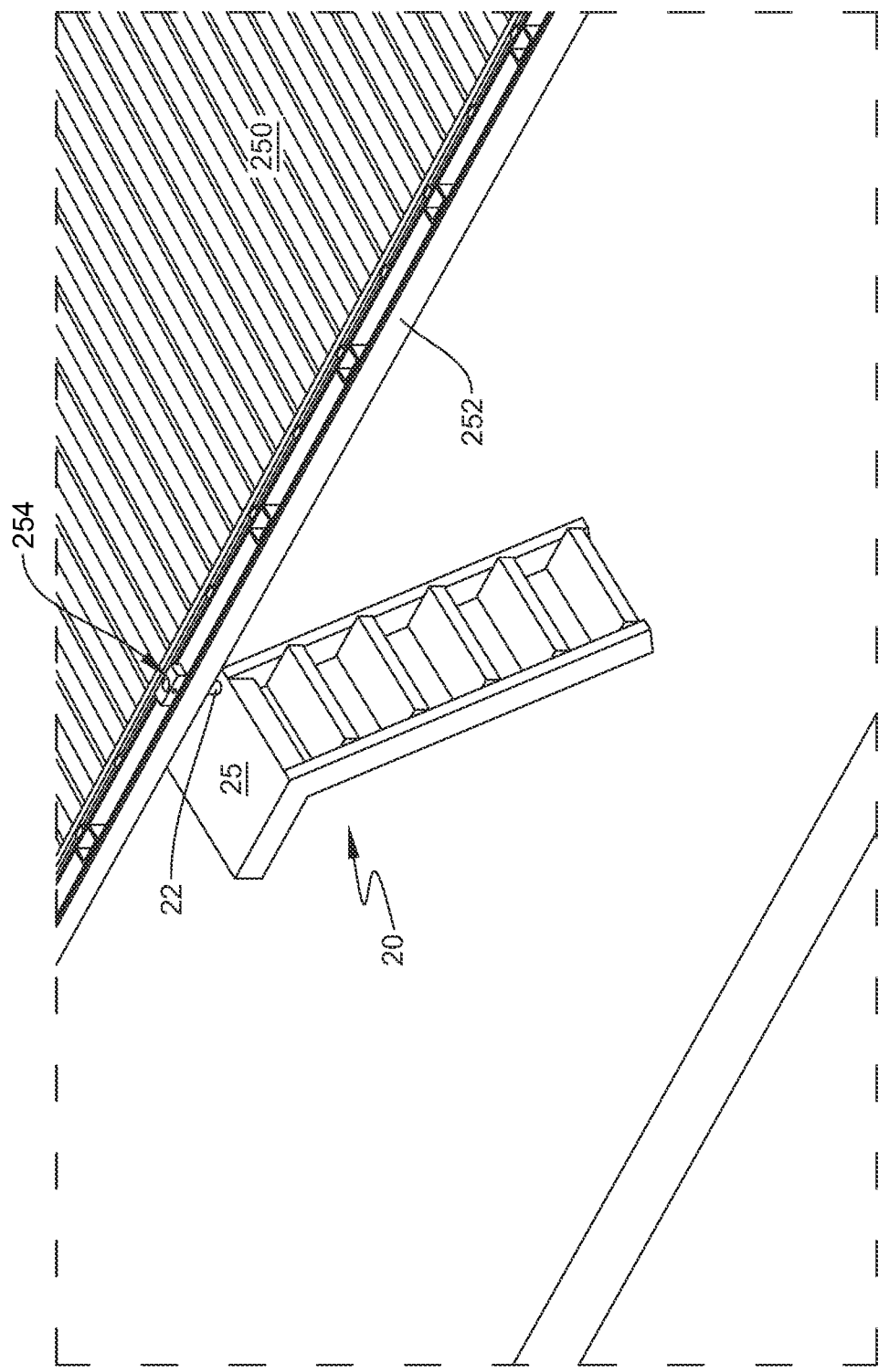
FIG. 1 is a first perspective view of a stair structure according to a first illustrative embodiment of the present invention, shown attached to a bed of a trailer and in a deployed position thereof.
Figure 2:
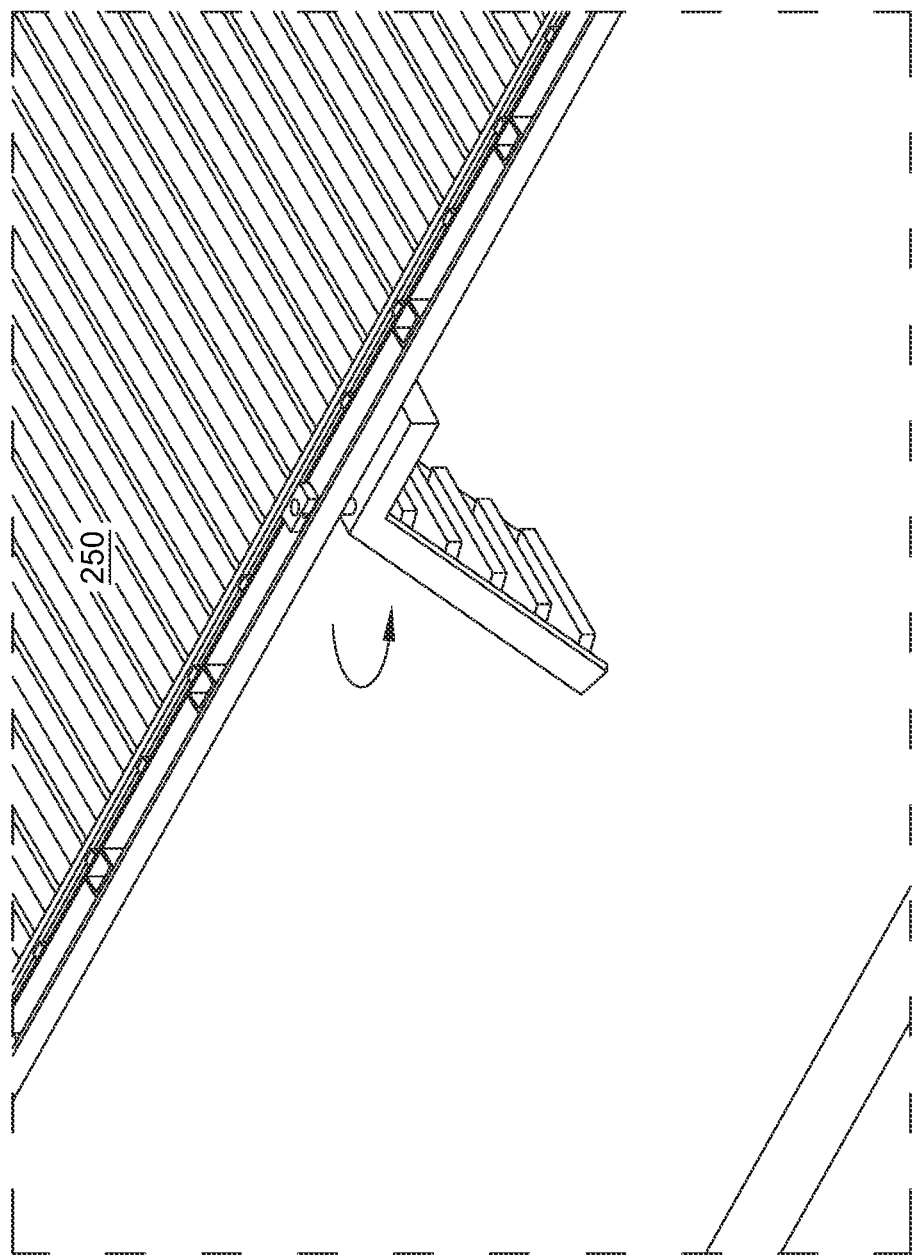
FIG. 2 is a second perspective view of the stair structure according to the first illustrative embodiment of the present invention, shown attached to the trailer bed and in a storage position thereof.

Referring initially to FIGS. 1 and 2 of the drawings, a transportable personal elevation device according to a first embodiment of the present invention takes the form of a stowable stair structure, which is shown generally at 20. The stowable stair structure 20 is provided for attaching to an underside of a bed 250 or other platform component of a vehicle or trailer.

It should be understood that, while the stair structure 20 is configured and arranged to be installable on, and used with a vehicle or trailer bed 250, the bed 250 is conventional, and does not form part of the present invention, per se. If desired, the stair structure 20 can be configured to be attached to other suitable areas of a vehicle or trailer.

When installed on the bed 250, the stair structure 20 is pivotally movable about a vertically oriented pivot pin 22, between a deployed position shown in FIG. 1 and a storage position shown in FIG. 2. In the storage position, the stair structure 20 is disposed under the bed 250, and in the deployed position, the stair structure extends outwardly and downwardly from an edge portion 252 of the bed.

Although the stair structure 20 is shown in FIG. 1 extending in a direction substantially parallel to the edge portion 252 of the bed 250 in the deployed position, it should be understood that the stair structure may be appropriately modified to make it extend in a direction substantially perpendicular to the edge portion of the bed in the deployed position, if desired.

Figure 3:
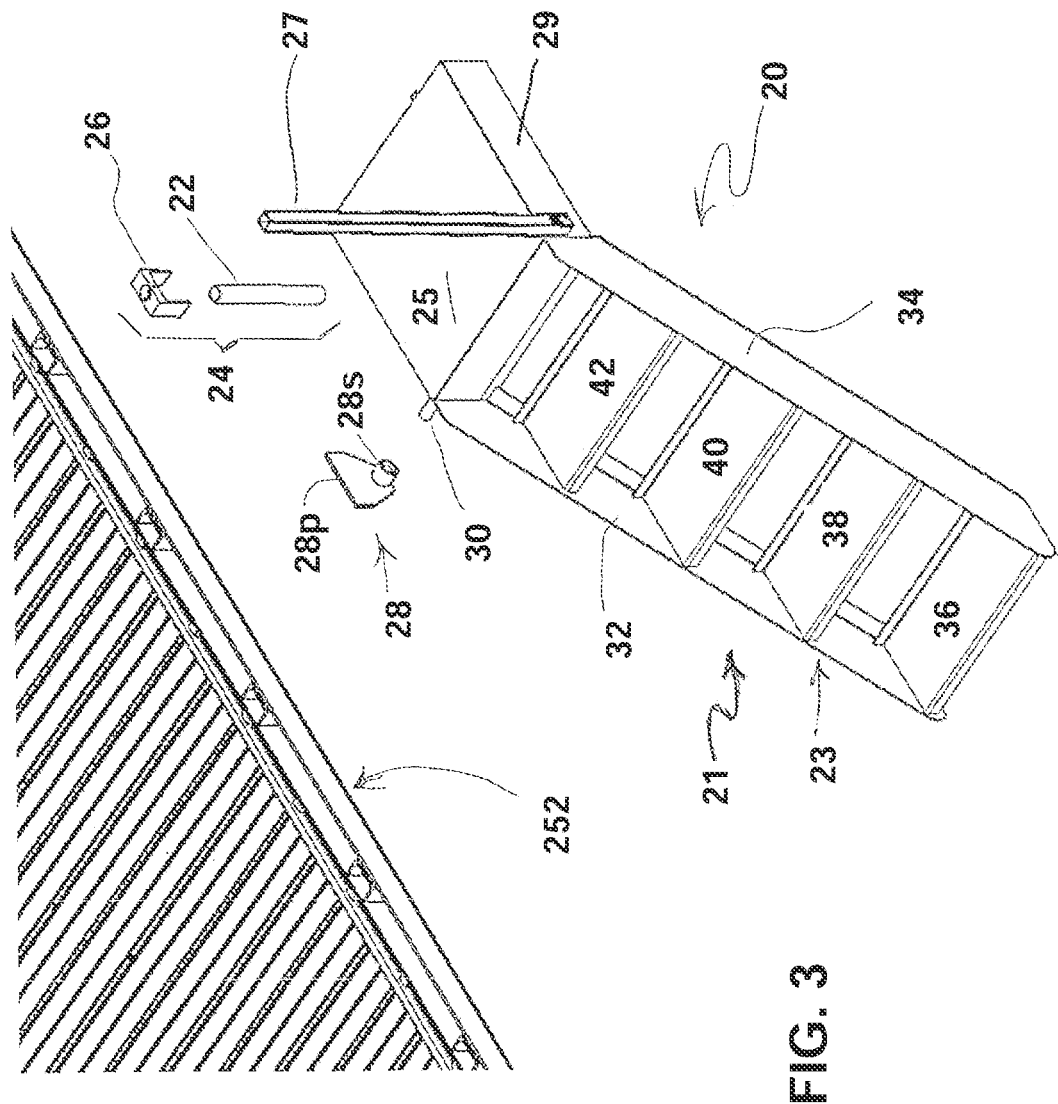
FIG. 3 is an exploded perspective view of the stair structure and trailer bed, with the stair structure shown in the deployed position.

The stair structure 20 is shown in an exploded perspective view in FIG. 3, in order to illustrate selected components thereof. The stair structure 20 is configured to be attached to the edge portion 252 of the bed 250 by a connector assembly 24, which includes the pivot pin 22 and associated mounting hardware, which may include a bracket 26 for attaching the pivot pin to a pocket 254 (FIG. 1) located at the edge of the bed. Such pockets are relatively well known and commonly provided on truck and trailer beds.

Alternatively, and as previously noted, the stair structure 20 may be configured to be attached to a different part of the vehicle or trailer, as needed.

The stair structure 20 includes a main stair body 21 which is attached to the bed 250 by the connector assembly 24. The main stair body 21 includes a ladder section 23 and an upper platform 25, which may be pivotally connected together.

As noted above, in this first embodiment, the pivot pin 22 extends along a substantially vertical axis in an installed configuration of the stair structure 20. The pivot pin 22 is shown separate from the platform 25 in the exploded view of FIG. 3 for illustrative purposes, but may be welded on to, or otherwise fixedly attached to an upper surface of the platform 25.

Alternatively, the pivot pin 22 may extend through a vertical hole formed in the platform 25, and the pivot pin may be configured to be fixed in place while the stair structure pivots around the pivot pin. Optionally, the pivot pin 22 may include a widened portion (not shown) at the lower end thereof, to better support the main stair body 21.

The platform 25 may have at least one handle or upright post 27 attached thereto, to permit grasping by a user while the user is climbing the stair structure 20. A separate post such as that shown at 27 may be used on each of the left and right sides of the platform 25. Optionally, such post(s) 27 may support a collapsible handrail (not shown). Where used, the post 27 is pivotally attached to a side edge portion of the platform 25, or to an upper portion of the ladder section 23, to allow movement of the post out of the way in preparation for pivotally moving the stair structure 20 from the deployed position to the storage position.

A socket member 28 may also be provided as part of the stair structure 20, and where used, the socket member may include a mounting plate 28*p* and a hollow cylindrical socket 28*s* affixed to the mounting plate and configured to receive a pin 30 attached to, and extending horizontally outwardly from another side edge portion of the platform 25, as shown.

Figure 7:
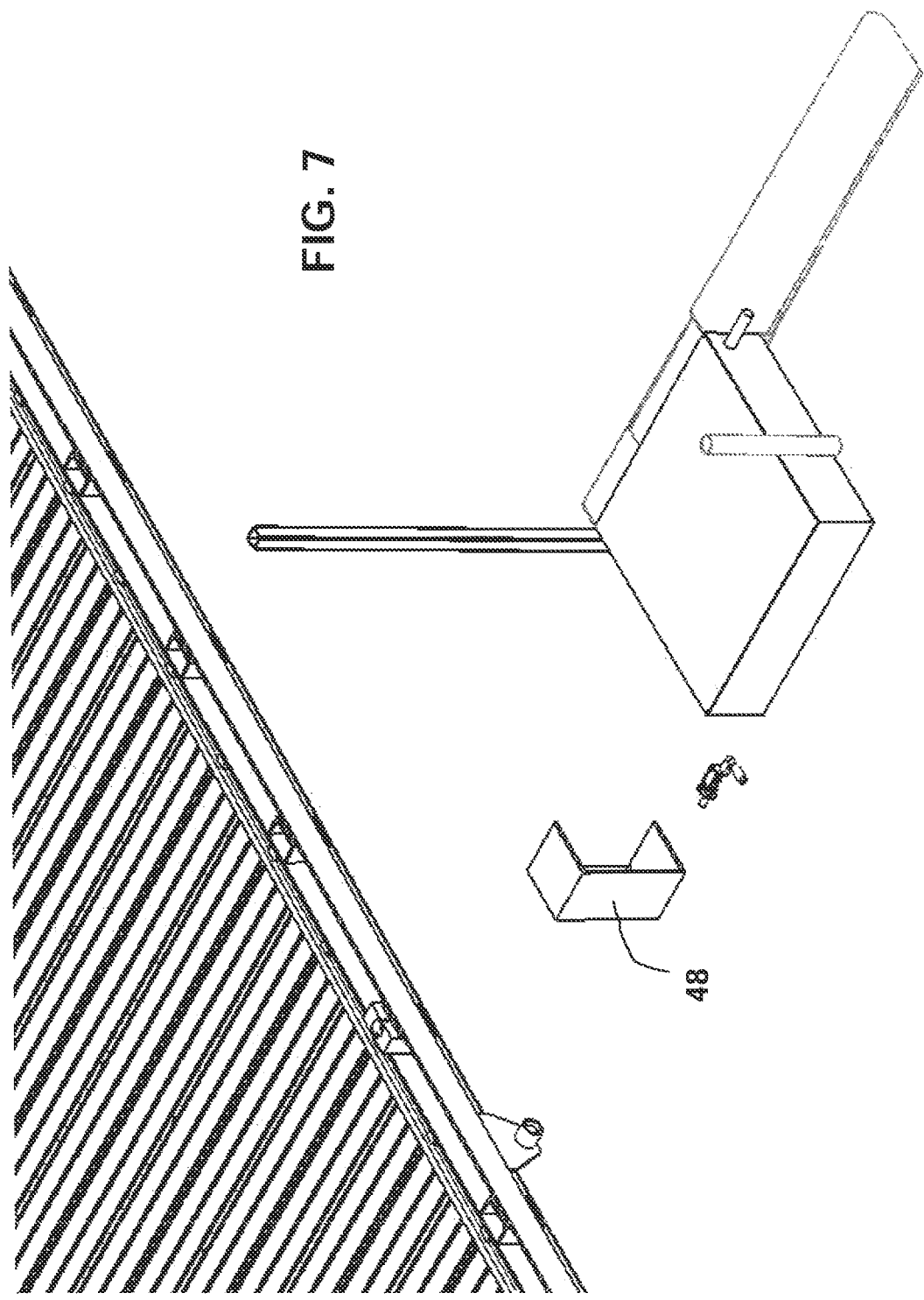
FIG. 7 is an exploded perspective view of the stair structure, associated hardware, and trailer bed from a vantage point above the stairs, with the stair structure shown in the deployed position.
Figure 10:
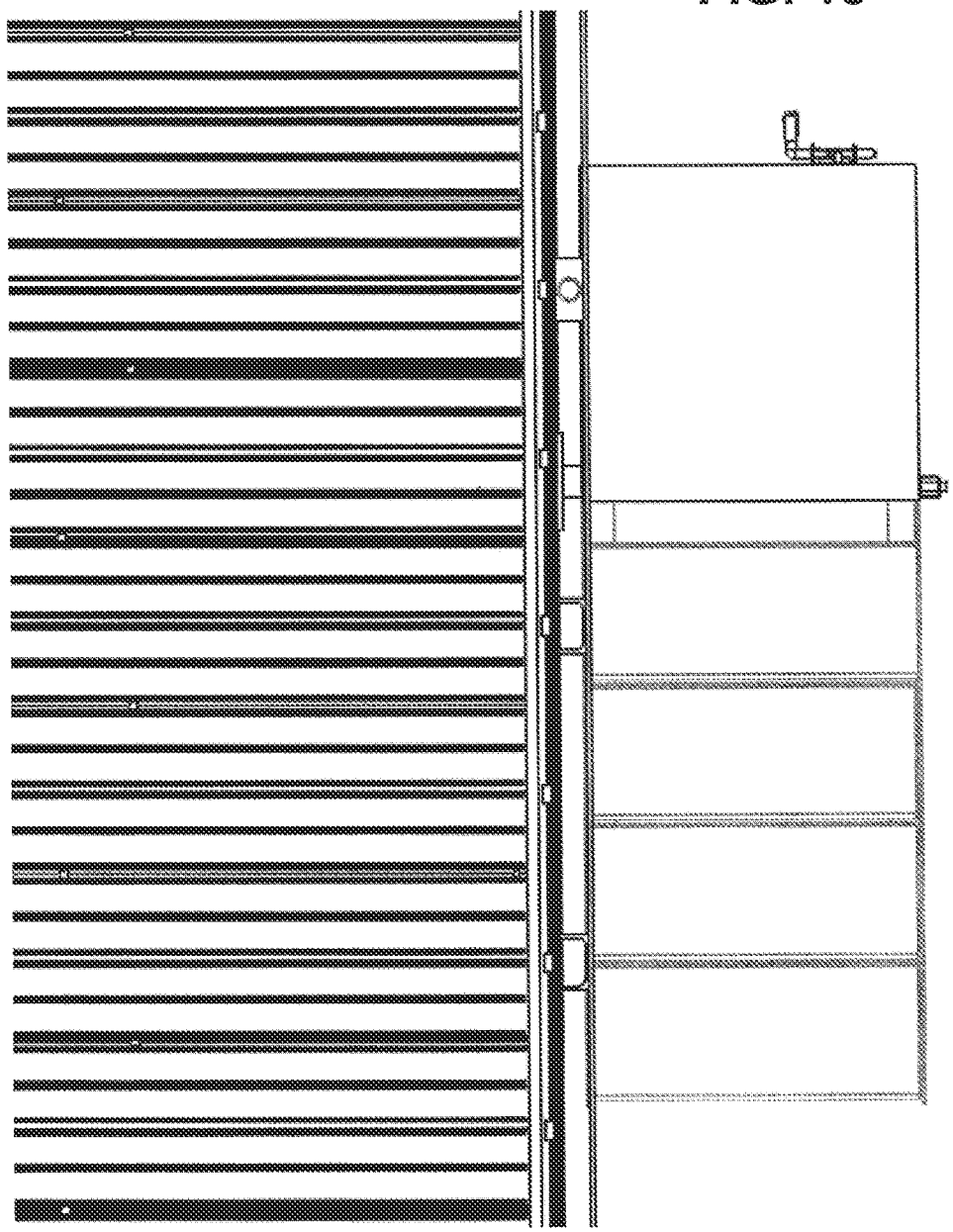
FIG. 10 is a top plan view of the assembled stair structure and trailer bed, with the stair structure shown in the deployed position.
Figure 11:
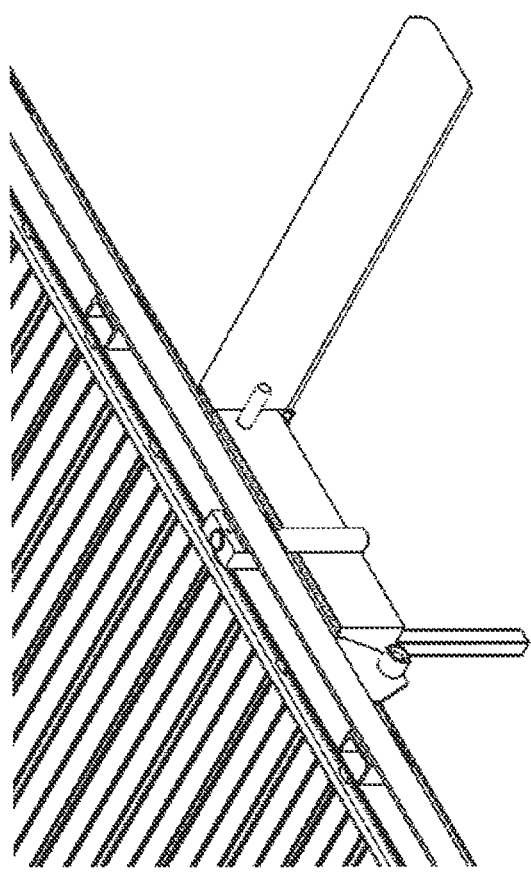
FIG. 11 is another perspective view of the stair structure and trailer bed from a vantage point above the stairs, showing the stair structure with the steps occluded and shown in the storage position.
Figure 12:
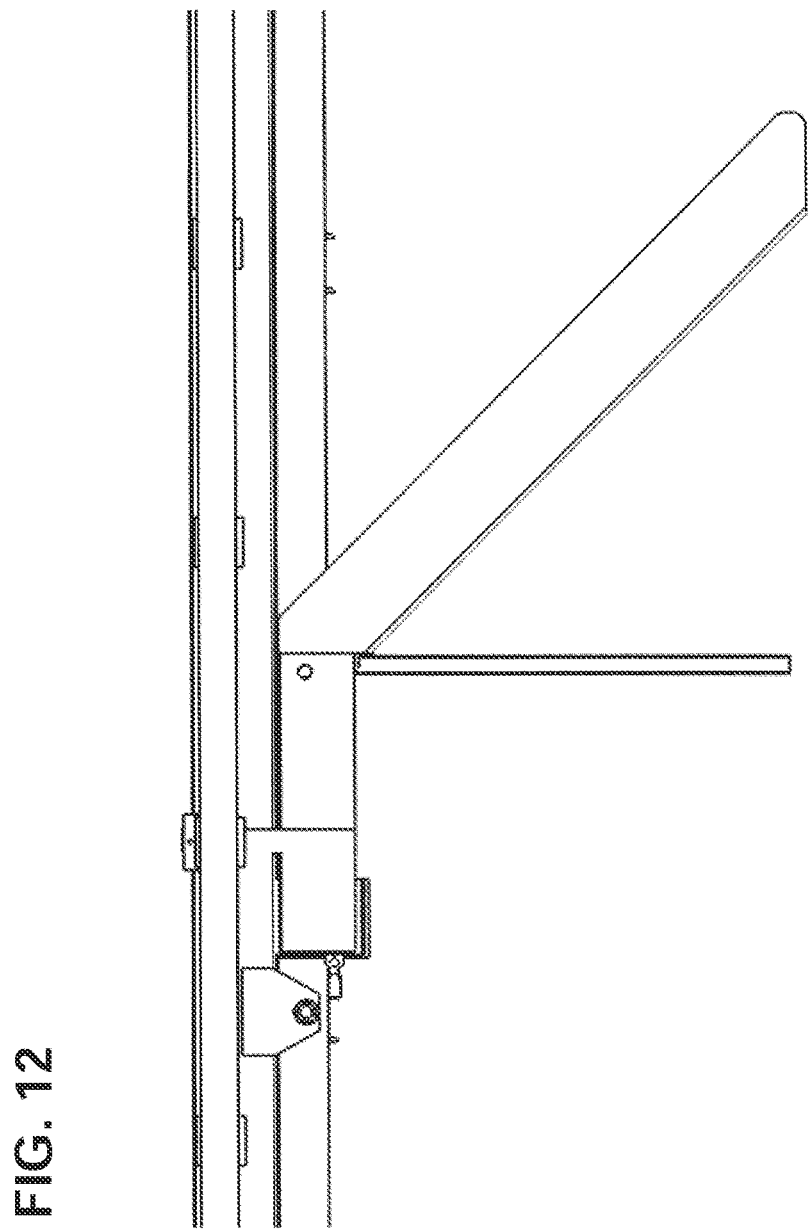
FIG. 12 is a side plan view of the assembled stair structure and trailer bed, with the stair structure shown in the storage position.
Figure 13:
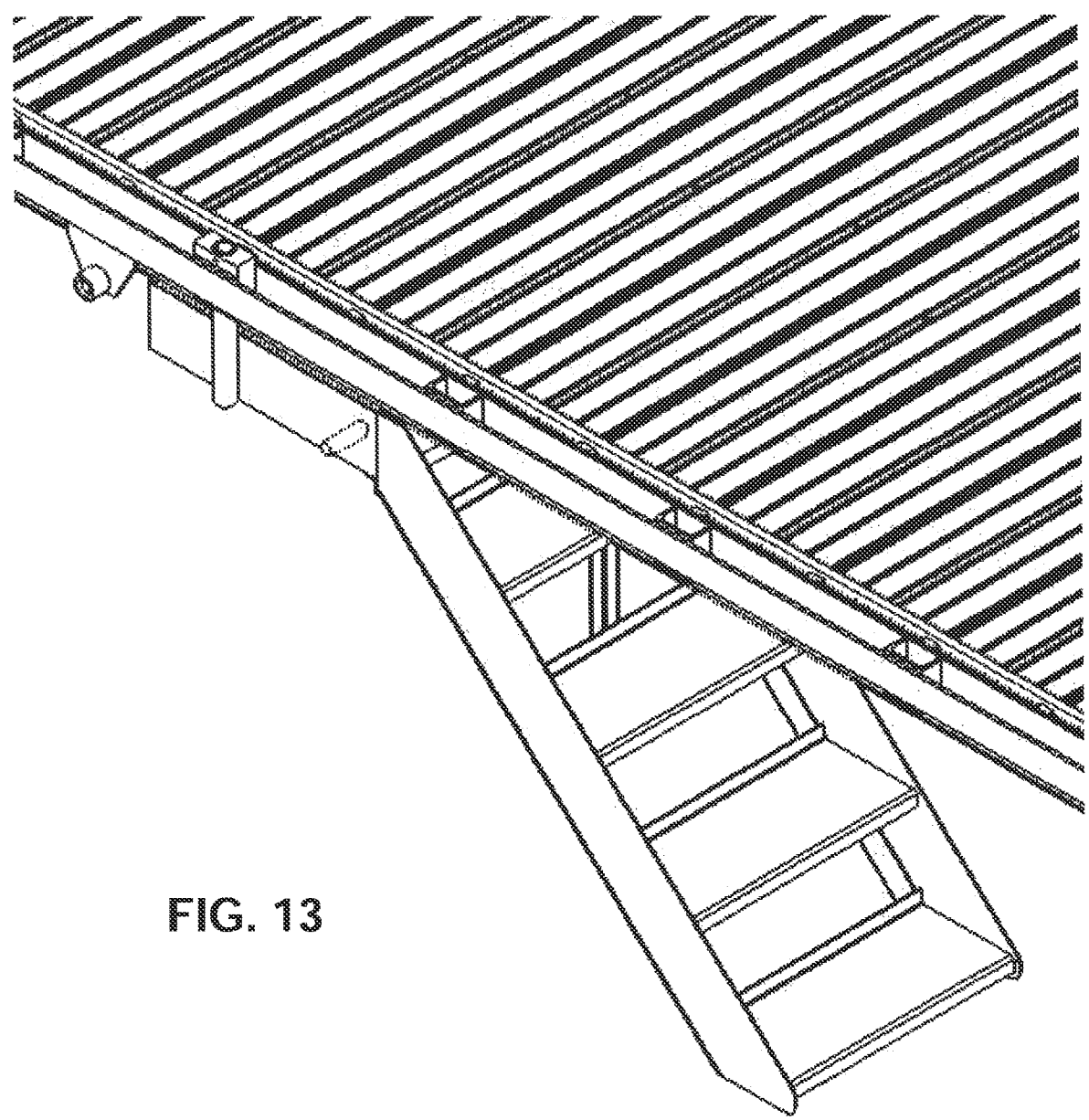
FIG. 13 is another perspective view of the stair structure and trailer bed from a vantage point above the stairs, with the stair structure shown in the storage position.
Figure 14:
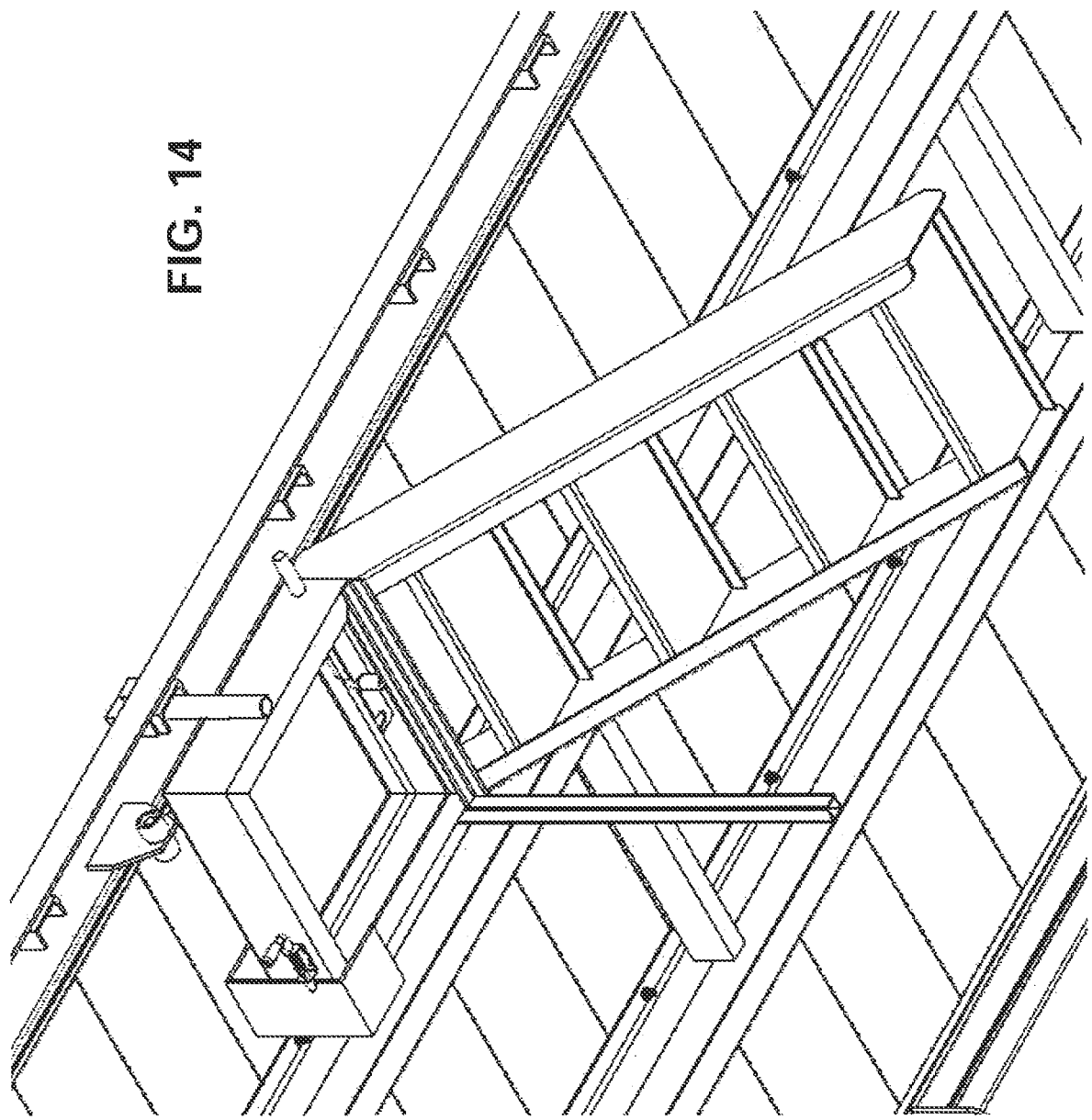
FIG. 14 is a perspective view of the assembled stair structure and trailer bed, from a vantage point below the stairs, with the stair structure shown in the storage position.

Alternatively, instead of the socket 28, a first square C-shaped clamping member (similar to that shown at 48) may be used below the bed 250, to nestingly receive and support an edge portion of the platform in the deployed position, and a second square C-shaped clamping member 48 (FIG. 7) may be used to nestingly receive and support an edge portion 29 of the platform in the storage position, to cooperate with the connector assembly 24 in supporting the weight of the stair structure 20.

The ladder section 23 includes a pair of spaced apart side supports, which may take the form of support plates 32, 34, which extend downwardly from the platform at an angle. The side support plates 32, 34 may be attached to a lower edge of the platform, or may be attached to a side edge of the platform, as shown in FIGS. 1-3.

The side support plates 32, 34 include lower end portions, respectively, which may be elevated above ground level by a specified amount such as, for example, 8-12 inches when installed on the trailer bed, in order to avoid contact with a road surface when in the stair structure 20 is in the storage position with the vehicle in motion.

Alternatively, the ladder section 23, including the side supports 32, 34 and step members 36, 38, 40 and 42, may be pivotally attached to the platform 25, to permit folding of the ladder section 23 below the platform in the storage position of the stair structure 20. Where so used, the ladder section 23 is capable of being moved to a storage position with portions of the side supports 32, 34 and step members 36, 38, 40 and 42 disposed below the platform.

In the embodiment of FIGS. 1-3, a plurality of spaced-apart step members, such as those shown at 36, 38, 40 and 42 extend between and are affixed to the side support plates 32, 34, and these step members are oriented substantially parallel to one another, as shown. In the depicted embodiment, the step members 36, 38, 40 and 42 are horizontal plate members.

Optionally, in different embodiment of the invention, the side supports may be made as telescopic tubes (not shown), each of which has one end of a step or rung attached, where the tubes may be either fully extended in a deployed configuration, or may be collapsed into a smaller stowed configuration.

The connector assembly 24 is configured and arranged such that when the stair structure 20 is attached to the bed, it can be rotated about the pivot pin 22, between a stowed, or stored position below the bed (shown in FIG. 2) and a deployed position which extends outwardly from an edge of the bed, as shown in FIG. 1.

Figure 4A:
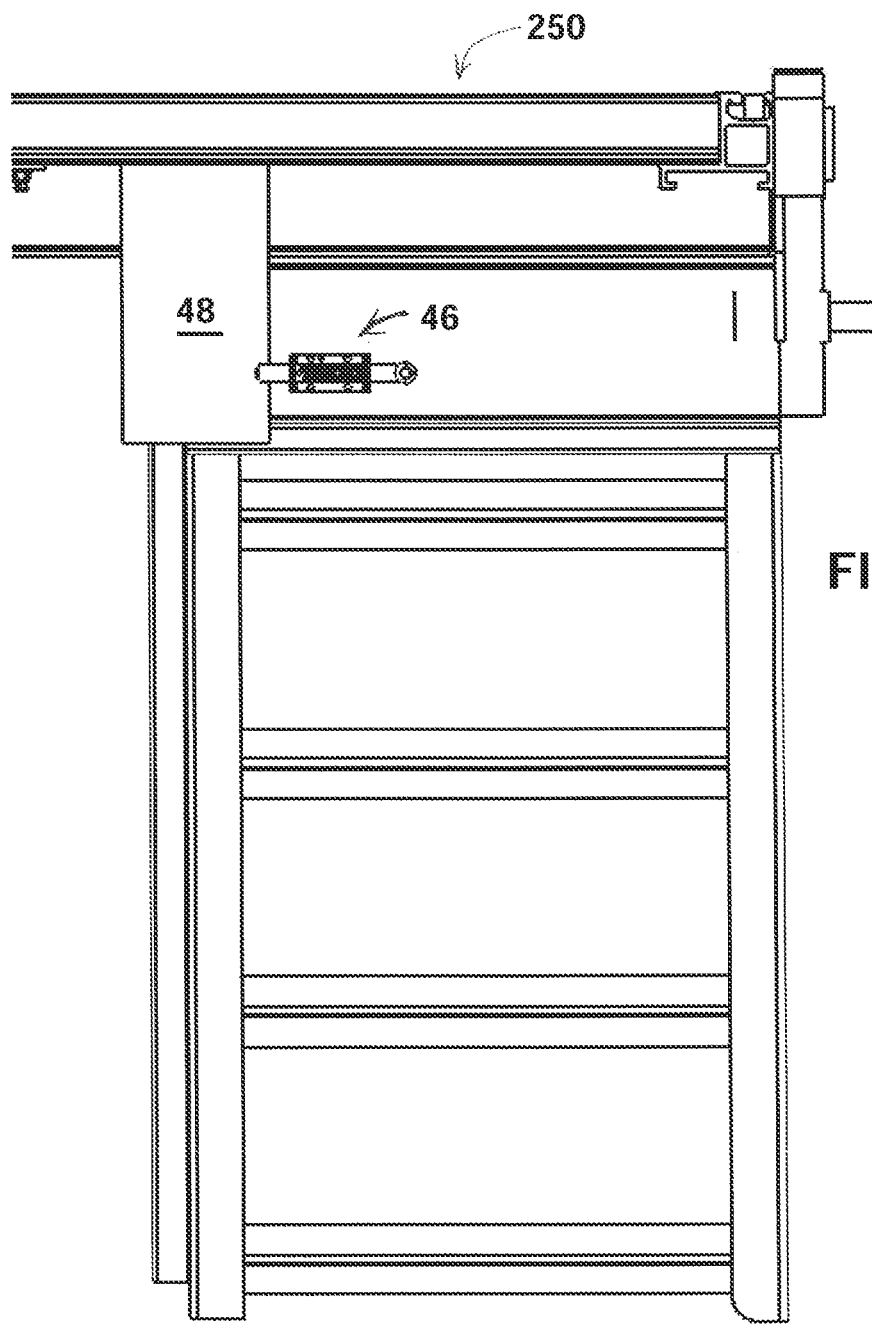
FIG. 4A is a first end plan view of the stair structure shown attached to the trailer bed in the storage position.
Figure 5:
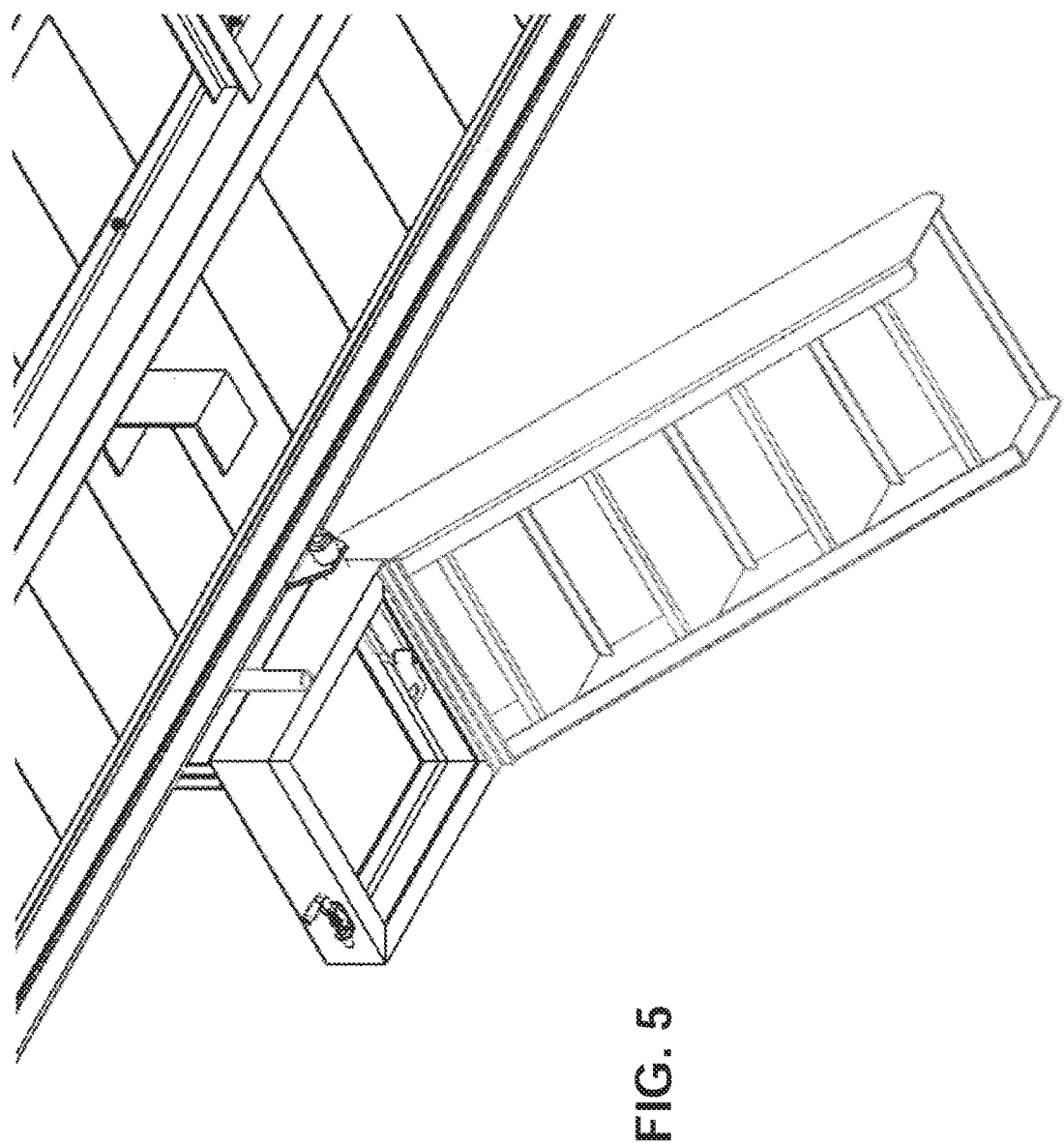
FIG. 5 is a perspective view of the assembled stair structure and trailer bed, from a vantage point below the stairs, with the stair structure shown in the deployed position.
Figure 6:
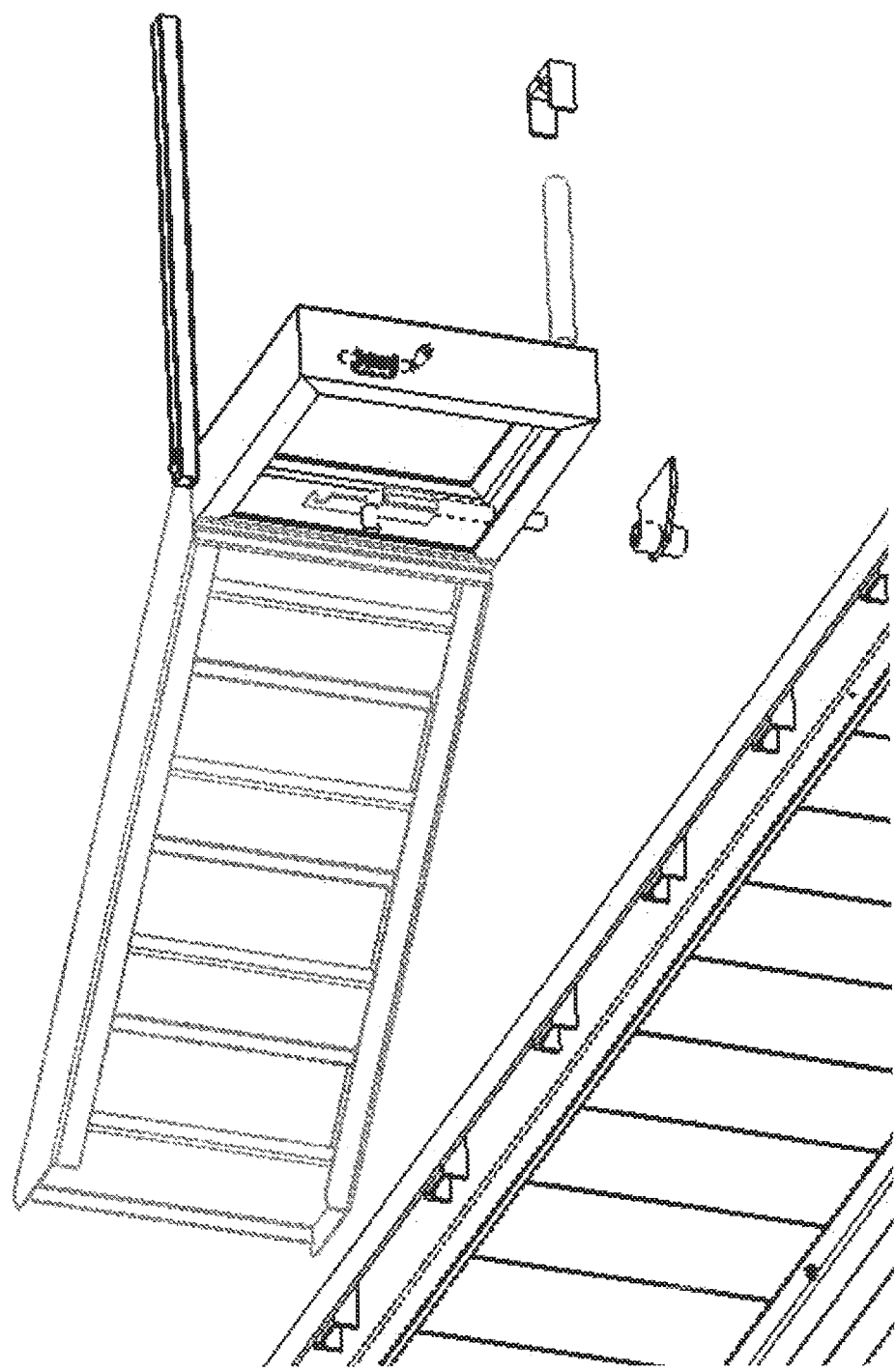
FIG. 6 is an exploded perspective view of the stair structure, associated hardware, and trailer bed from a vantage point below the stairs, with the stair structure shown in the deployed position.

Referring now to FIG. 4A, a latch assembly 46 may also be provided for temporarily locking a position of the stair structure 20 in relation to the bed 250, either in the storage position or in the deployed position. A square C-shaped support bracket 48 (FIGS. 5, 7) may be provided to be affixed to the lower surface of the bed 250, for supportively receiving an edge portion of the platform 25 therein in the storage position of the stair structure.

Kit

Another embodiment of the invention provides a kit of components capable of being assembled to form a stair structure 20 for attaching to an underside of a vehicle or trailer bed.

The kit 100 includes most of the components discussed above in connection with the first embodiment, provided in an unassembled arrangement and separate from a vehicle bed 250.

A kit 100 according to the present invention includes an upper platform, such as that shown at 25, and a connector assembly 24, which includes a pivot pin 22 and associated mounting hardware, possibly including a bracket 26 for attaching the pivot pin to a pocket 254 located at an edge of a truck or trailer bed 250.

The connector assembly 24 is configured and arranged such that when the stair structure 20 is assembled, using the components of the kit 100, and attached to the bed 250, the stair structure 20 can be pivotally moved about the pivot pin 22, which extends along a substantially vertical axis, between a stored position below the bed and a deployed position which extends outwardly from an edge of the bed.

The kit 100 also includes a ladder subassembly 23, including a pair of spaced apart side supports 32, 34 for attaching to the platform 25, and a plurality of spaced-apart step members such as those shown at 36, 38, 40 and 42 extending between the side supports and oriented substantially parallel to one another.

The kit 100 also includes a latch assembly 46 for temporarily locking a position of the stair structure 20 in relation to the bed 250, either in the storage position or in the deployed position, when the kit has been installed on the bed 250.

Figure 4B:
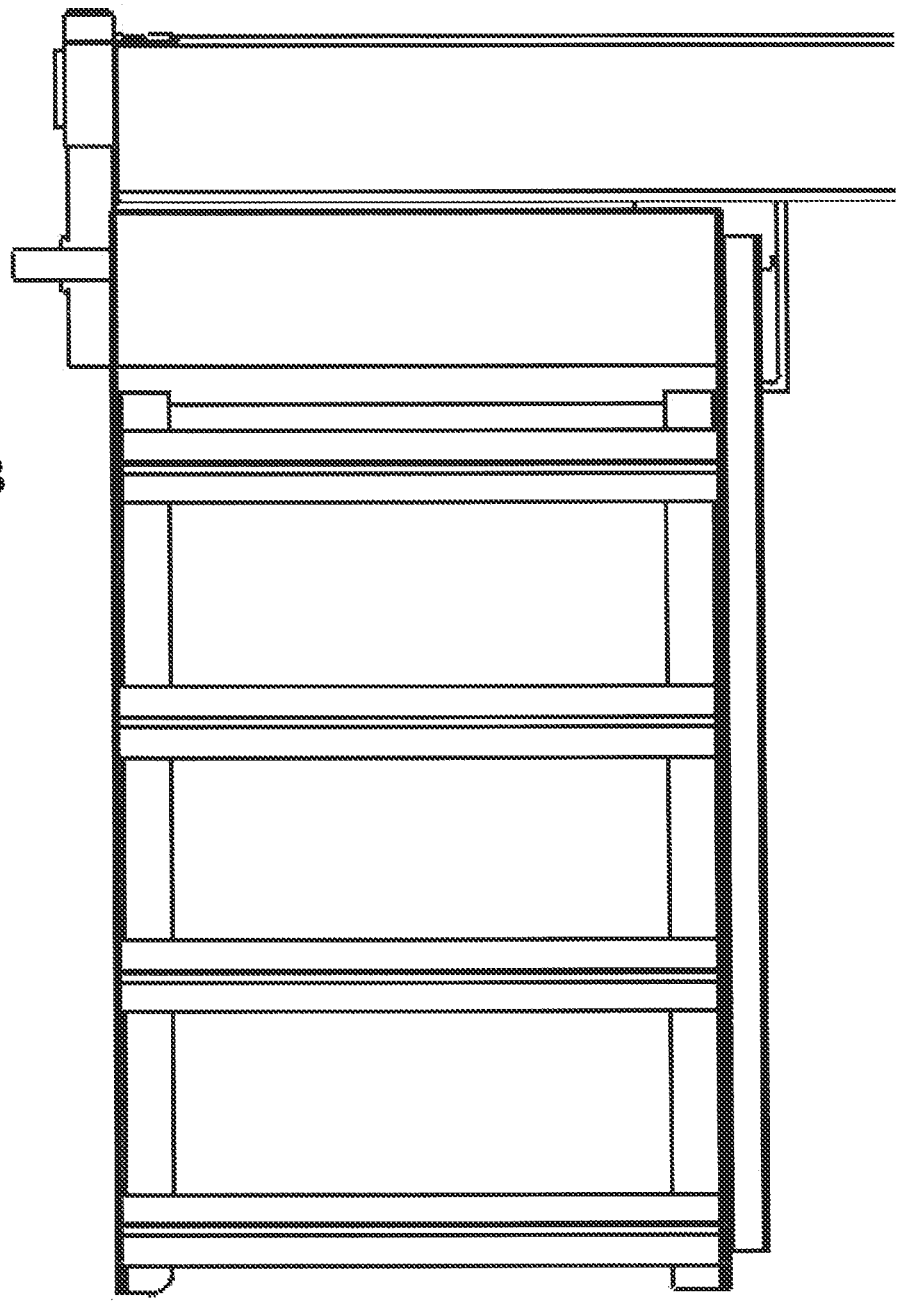
FIG. 4B is a second end plan view of the stair structure shown attached to the trailer bed in the storage position.

A square C-shaped support bracket 48 (FIGS. 4, 7) may be provided in the kit to be affixed to the lower surface of the bed 250, for supportively receiving an edge portion of the platform 25 therein in the storage position of the stair structure.

Method of Use

The present invention also relates to a method of using the stair structure 20 hereof.

The method includes a first step of unlatching the stair structure from a storage position below a vehicle or trailer bed by moving a latch member 46.

The method includes a second step of pivotally moving the stair structure out from below the trailer bed, and placing the stair structure into the deployed position thereof.

The method includes a third, optional step of climbing up the stairs 36, 38, 40 and 42 to the platform 25, and on to the trailer bed.

The method includes a fourth, optional step of descending the stairs, a fifth step of pivotally moving the stair structure into the storage position, and a final step of moving the latch member to temporarily lock the stair structure in the storage position.

Second Embodiment

Referring now to FIGS. 15-18, a stowable stair structure according to a second embodiment of the present invention is shown generally at 120. The stair structure 120 is provided for attaching to an underside of a bed 250 or other structural component of a vehicle or trailer. In FIGS. 15-18, a portion of the bed 250 is omitted from the drawing for illustrative purposes.

It should be understood that, while the stair structure 120 is configured and arranged to be installable on, and used with a vehicle or trailer bed 250, the bed 250 is conventional, and does not form part of the present invention, per se. If desired, the stair structure 20 can be configured to be attached to other suitable areas of a vehicle or trailer.

Figure 15:
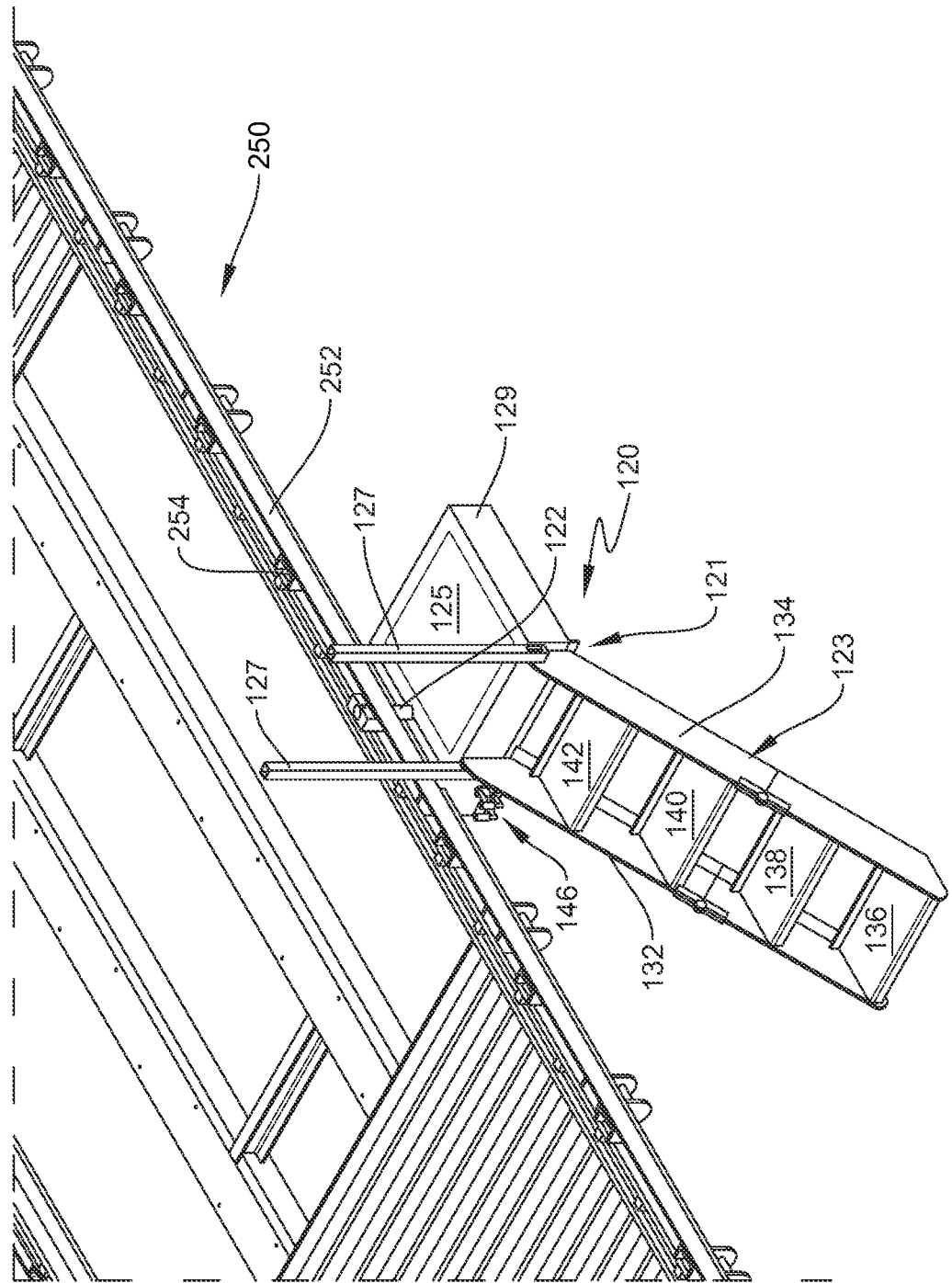
FIG. 15 is a first perspective view of a stair structure according to a second illustrative embodiment of the present invention, shown attached to a bed of a trailer and in a deployed position thereof, with portions of the trailer omitted for purposes of illustration.
Figure 17:
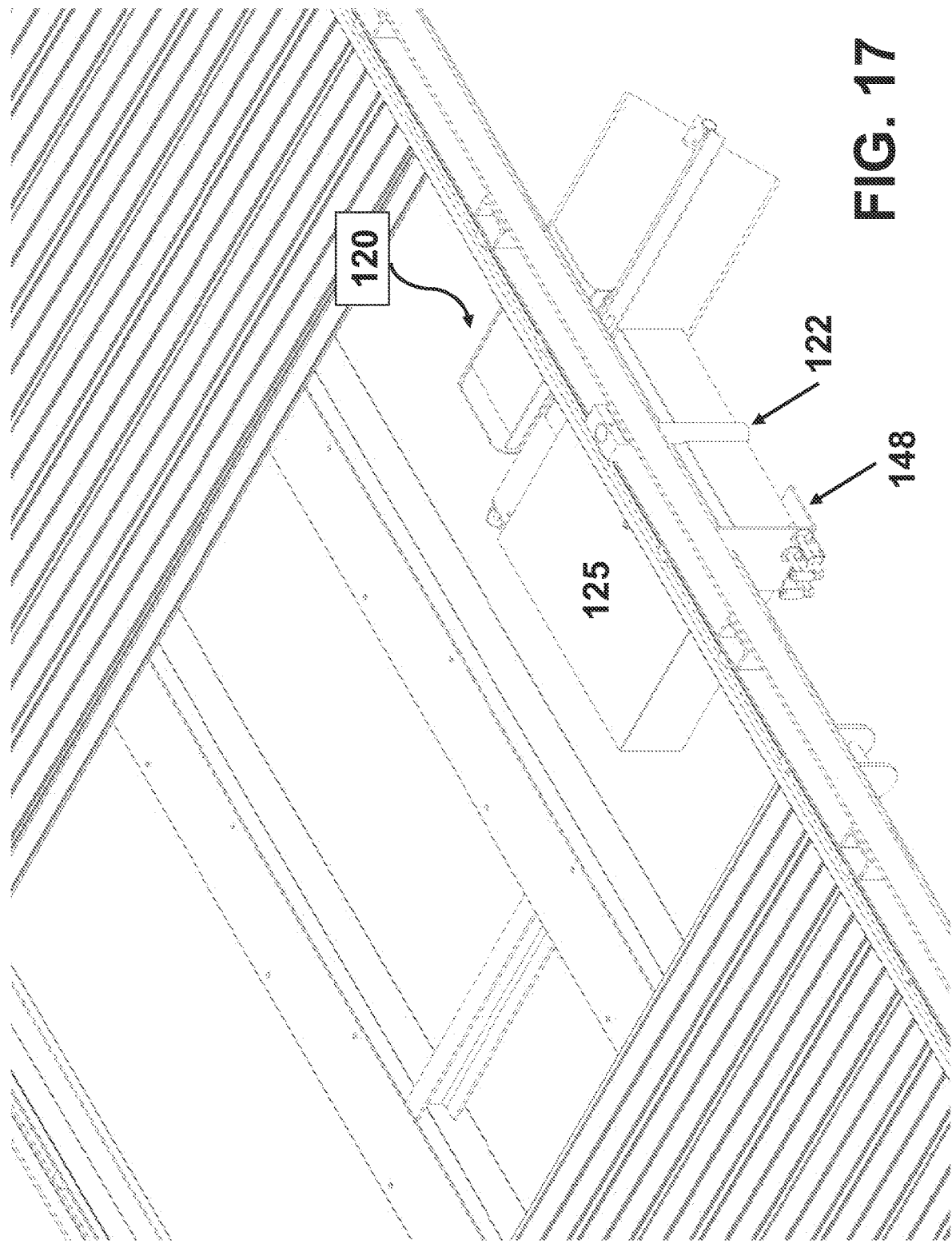
FIG. 17 is a third perspective view of the stair structure according to the second embodiment of the present invention, shown attached to the trailer bed and in a folded and storage position thereof.

When installed on the bed 250, the stair structure 120 is pivotally movable about a vertically oriented pivot pin 122, between a deployed position shown in FIG. 15 and a folded and storage position shown in FIG. 17. In the storage position, the stair structure 120 is disposed under the bed 250, and in the deployed position, the stair structure extends outwardly and downwardly from an edge portion 252 of the bed.

Although the deployed stair structure 120 is shown in FIG. 15 extending in a direction substantially parallel to an edge portion 252 of the bed 250 in the deployed position, it should be understood that the stair structure may be appropriately modified to make it extend in a direction substantially perpendicular to the edge portion of the bed in the deployed position, if desired.

The stair structure 120 is configured to be attached to the edge portion 252 of the trailer bed 250 by a connector assembly 124, which includes the pivot pin 122 and associated mounting hardware, which may include a bracket, similar to that shown at 26 (FIG. 3), for attaching the pivot pin to a pocket 254 located at the edge of the bed 250. Such pockets are relatively well known, and are commonly provided on truck and trailer beds.

Alternatively, and as previously noted, the stair structure 120 may be configured to be attached to a different part of the vehicle or trailer, as needed.

The stair structure 120 includes a main stair body 121 which is attached to the bed 250 by the connector assembly 124. The main stair body 121 includes a ladder section 123 and an upper platform 125, which may be pivotally connected together.

As noted above, the pivot pin 122 extends along a substantially vertical axis in an installed configuration of the stair structure 120. The pivot pin 122 may be welded on to, or otherwise fixedly attached to an upper surface of the platform 125.

Alternatively, the pivot pin 122 may extend through a vertical hole formed in the platform 125, and the pivot pin may be configured to be fixed in place while the stair structure pivots around the pivot pin. Optionally, the pivot pin 122 may include a widened portion (not shown) at the lower end thereof, to better support the main stair body 121.

Figure 16:
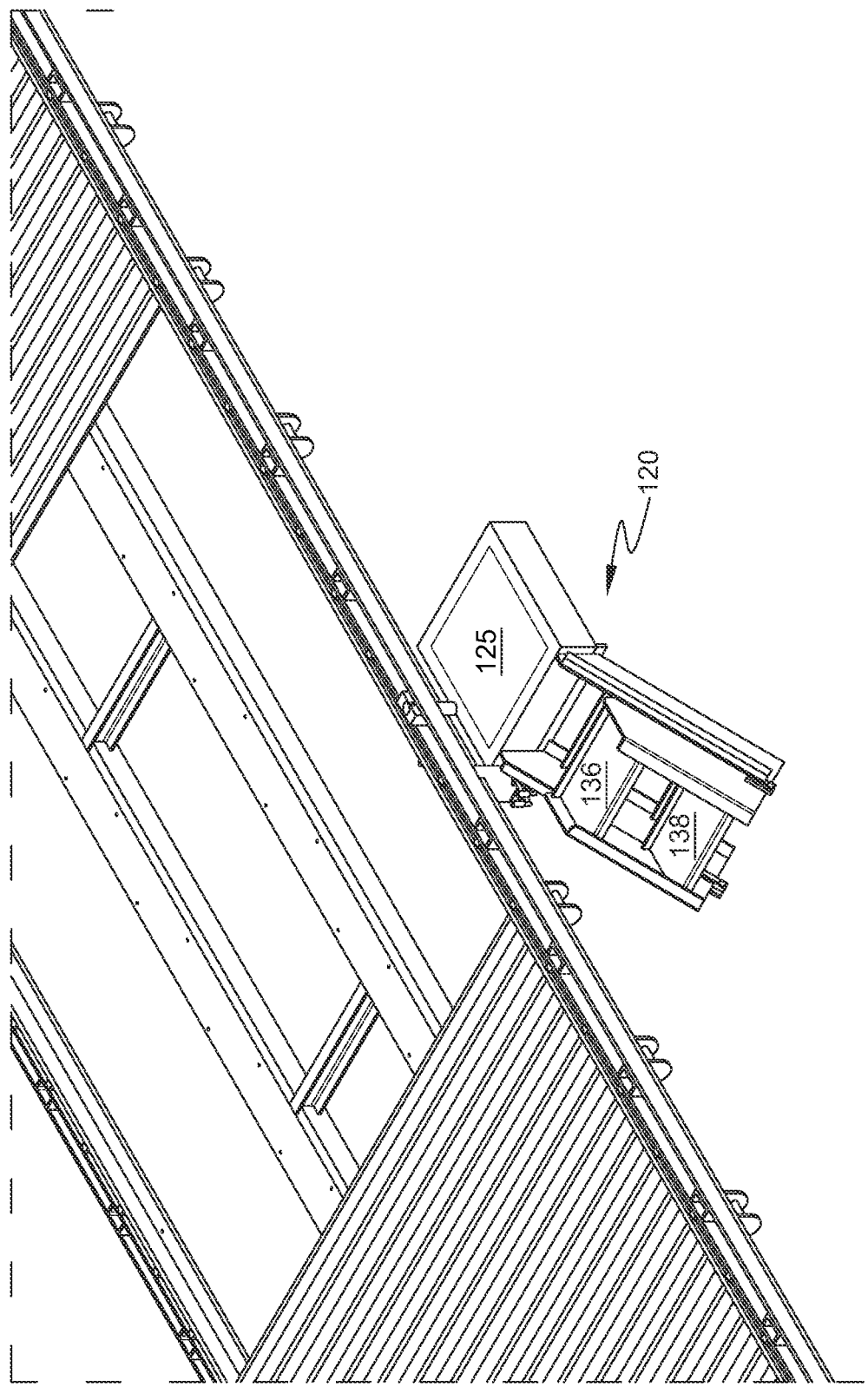
FIG. 16 is a second perspective view of the stair structure according to the second embodiment of the present invention, similar to FIG. 15 but with a ladder portion of the stair structure in a folded configuration.

The platform 125 may have one or more handle or post 127 attached thereto to permit grasping by a user while climbing the stair structure 120. A post such as that shown at 127 may be used on each of the left and right sides of the platform 125, as shown. Optionally, either or both of such posts 127 may support a collapsible handrail (not shown). Where used, the posts 127 are pivotally attached to side edge portions of the platform 125, or to an upper portion of the ladder section 123, to allow movement of the posts out of the way in preparation for pivotally moving the folded stair structure 120 from the deployed position to the storage position. The collapsed and storage position of the posts 127 is shown in FIG. 16.

A socket member may also be provided as part of the stair structure 120, and this socket member is similar to the socket member 28 shown in FIG. 3 and described herein in connection with the first embodiment.

Alternatively, instead of the socket member, a first square C-shaped clamping member (not shown) may be used below the bed 250 to nestingly receive and support an edge portion of the platform in the deployed position, and a second square C-shaped clamping member 148 (FIG. 17) may be used to nestingly receive and support an edge portion 129 of the platform in the storage position, to cooperate with the connector assembly in supporting the weight of the stair structure.

The ladder section 123 includes a pair of spaced apart side supports, which may take the form of support plates 132, 134 which are attached to the platform 125, and these side supports extend downwardly from the platform at an angle. In this second embodiment, each of the support plates 132, 134 is made in two separate segments which are pivotally attached to one another to permit the lower half of the ladder section to be folded upwardly until it contacts the upper half, in the folded configuration shown in FIG. 16. The side support plates 132, 134 may be attached to a lower edge of the platform 125, or may be attached to a side edge of the platform, as shown in FIGS. 15-16.

Alternatively, the ladder section 123, including the side supports 132, 134 and step members 136, 138, 140 and 142, may be pivotally attached to the platform 125, to permit folding of the ladder section 123 below the platform in the storage position of the stair structure 120. Where so used, the ladder section 123 is capable of being moved to a storage position, as shown in FIG. 17, with the side supports 132, 134 and step members 136, 138, 140 and 142 disposed below the trailer bed 250.

Optionally, in different embodiment of the invention, the side supports may be made as telescopic tubes (not shown), each of which has one end of a step or rung attached, where the tubes may be either fully extended in a deployed configuration, or may be collapsed into a smaller stowed configuration.

In the embodiment of FIG. 15, a plurality of spaced-apart step members, such as those shown at 136, 138, 140 and 142 extend between and are affixed to the side support plates 132, 134, and these step members are oriented substantially parallel to one another, as shown.

In the depicted embodiment, the step members 136, 138, 140 and 142 are horizontal plate members.

The connector assembly 124 is configured and arranged such that when the stair structure 120 is attached to the bed 250, it can be rotated about the pivot pin 122, between a stowed, or stored position below the bed (shown in FIG. 17) and a deployed position which extends outwardly from an edge of the bed, as shown in FIG. 15.

A latch assembly 146 may also be provided for temporarily locking a position of the stair structure 120 in relation to the bed 250, either in the storage position or in the deployed position. A square C-shaped support bracket 148 (FIG. 17) may be provided to be affixed to the lower surface of the bed 250, for supportively receiving an edge portion of the platform 125 therein in the storage position of the stair structure 120.

Third Embodiment

A third embodiment of a transportable personal elevation device 220 according to the present invention is shown in FIGS. 19A-19D, 20A-20D, 21A-21D, and 22A-22D.

In this third embodiment, a transportable powered personal elevator device 220 is provided for pivotal attachment to a trailer bed 250, or to another suitable vehicle surface, by placing a pivot pin 222 in a hollow support socket 223 provided on the trailer bed. The device 220 according to this third embodiment is supported on top of the trailer bed 250, as shown.

The powered personal elevator device 220 includes a platform assembly with a platform 225 for supporting a user thereon. The platform assembly also includes a platform support member 230 supporting the platform thereon. The platform is pivotally attached to a platform support member 230 in such a way as to permit angular adjustment of the platform 225, and the platform support member also permits vertical adjustment of the platform so that it can be selectively raised and lowered.

In this embodiment, the platform support member 230 includes a support frame 232 and a vertically oriented platform support shaft 233 attached to the support frame, and being selectively movable in relation to the support frame. The platform support shaft 233 has a handle 234 attached to an upper end thereof, to permit grasping by a user.

The powered personal elevator device 220 according to the third embodiment also includes an electrically powered height-adjustment mechanism for selectively raising or lowering the support frame. Such height-adjustment mechanism is provided, in this embodiment, by a winch assembly 221 including a pulley 235, a cable 236 and a spool (not shown) capable of selectively winding or unwinding the cable.

FIGS. 19A-19D are sequential perspective views of a rear portion of a semi truck trailer having a transportable personal elevation device according to the third embodiment of the present invention mounted thereon, where the sequence shows steps in operation of the device.

Figure 19A:
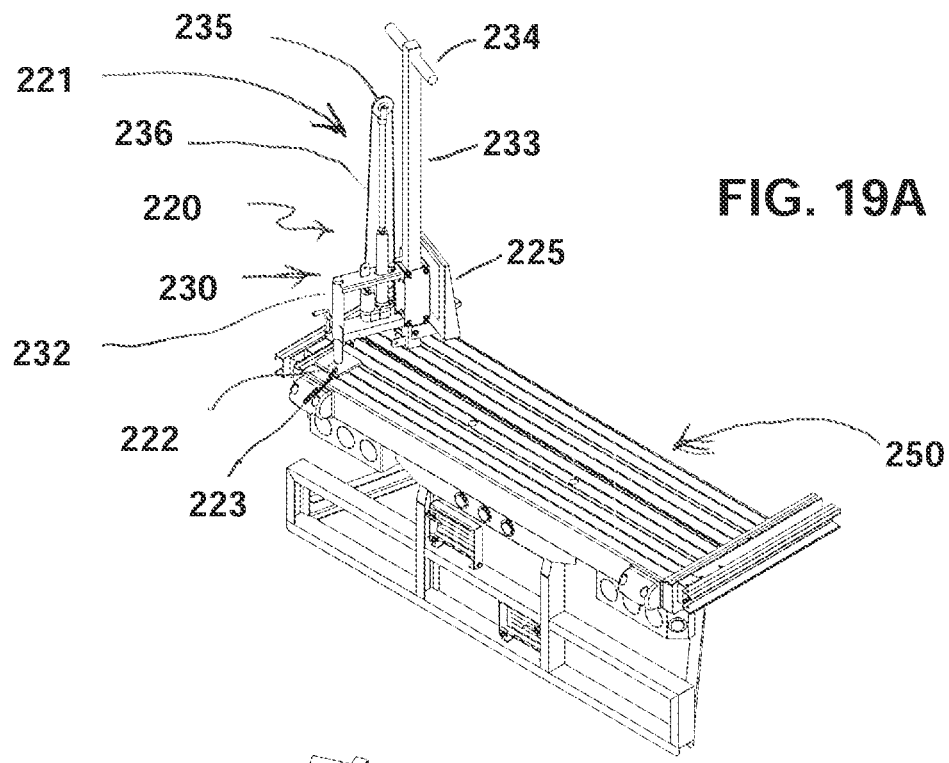
FIGS. 19A-19D are sequential perspective views of a rear portion of a semi truck trailer having a transportable personal elevation device according to a third embodiment of the present invention mounted thereon, where the sequence shows steps in operation of the device.

In FIG. 19A, the transportable personal elevation device 220 has been pivotally rotated inwardly about the pivot pin 222, to a storage position inside of the trailer bed 250.

Figure 19B:
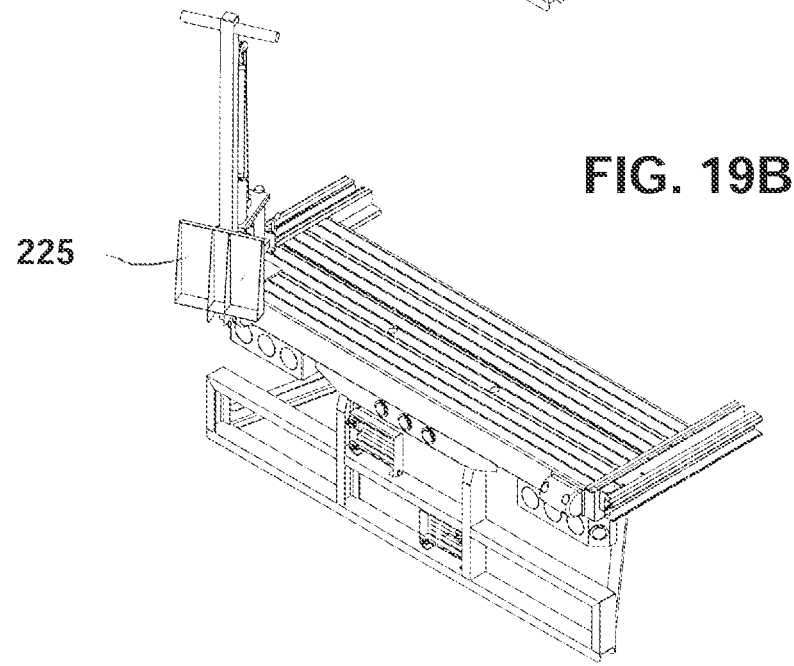

In FIG. 19B, the elevation device 220 has been pivotally rotated outwardly about the pivot pin 222 to a use position where the platform 225 is disposed outside of the trailer bed 250.

The winch assembly 221 may be powered by an electric motor disposed inside of the support frame 232. Electricity for the motor may be provided by a rechargeable battery (not shown), which is removable, as needed, for security.

As an alternative to the winch assembly 221, a hydraulically actuated height-adjustment mechanism, including a hydraulic pump, may be used as part of the elevation device 220.

Figure 19C:
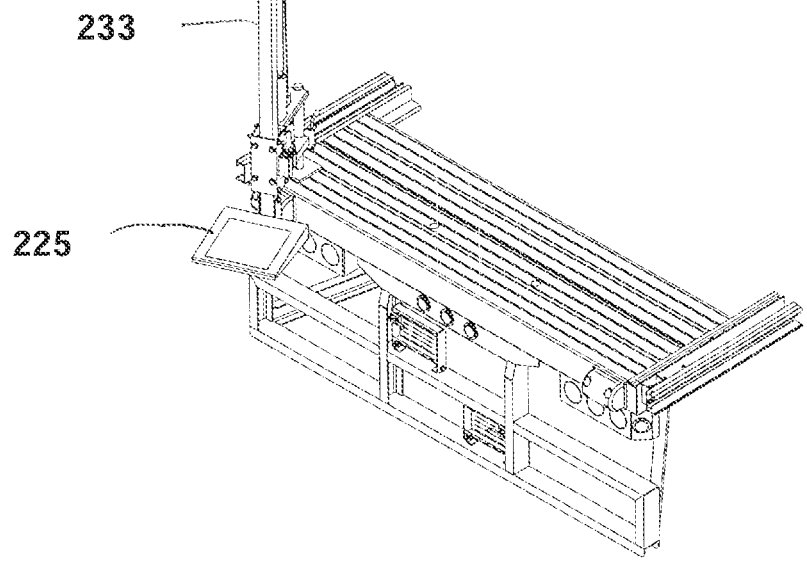
Figure 19D:
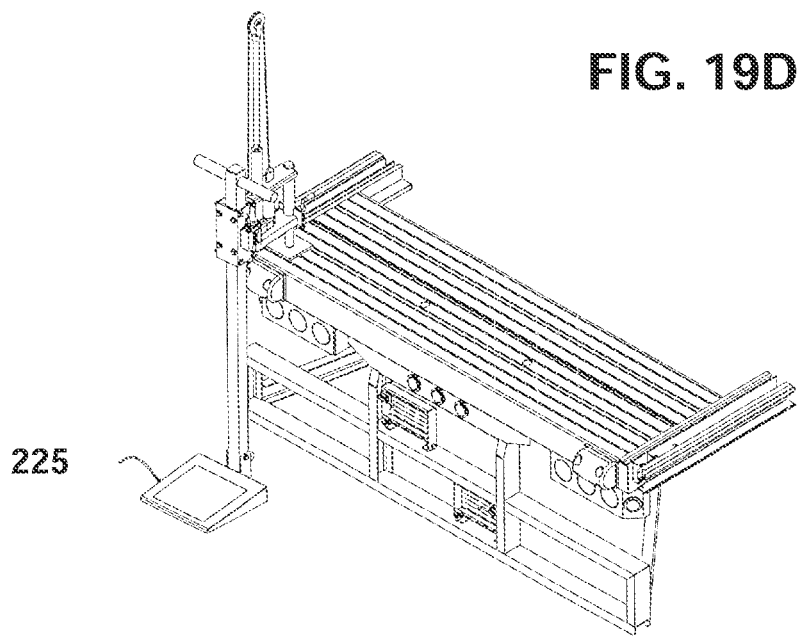
Figure 20A:
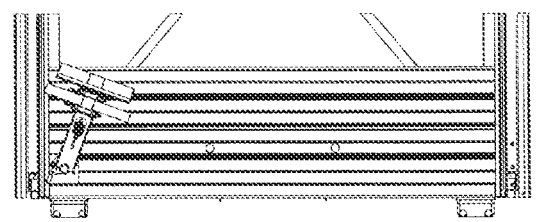
Figure 20B:
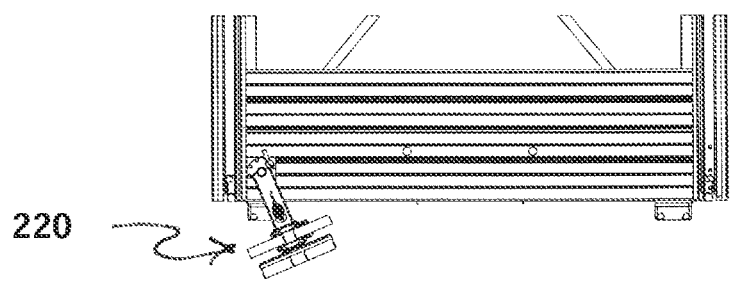
Figure 20C:
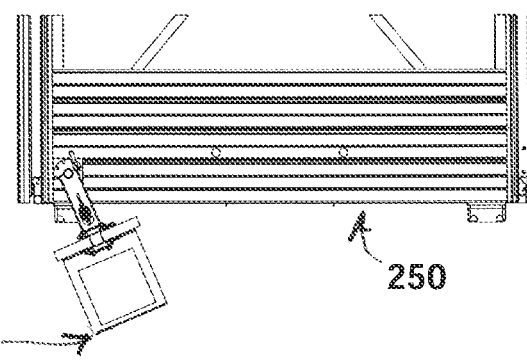
Figure 20D:
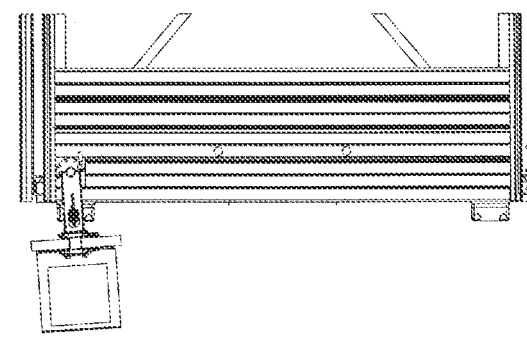
Figure 21A:
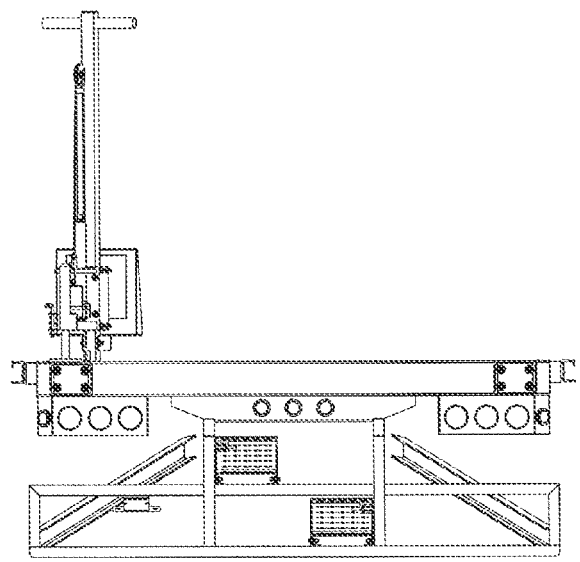
FIGS. 21A-21D are sequential rear plan views of a rear portion of a semi truck trailer having the transportable personal elevation device according to the third embodiment of the present invention mounted thereon, where the sequence shows steps in operation of the device.
Figure 21B:
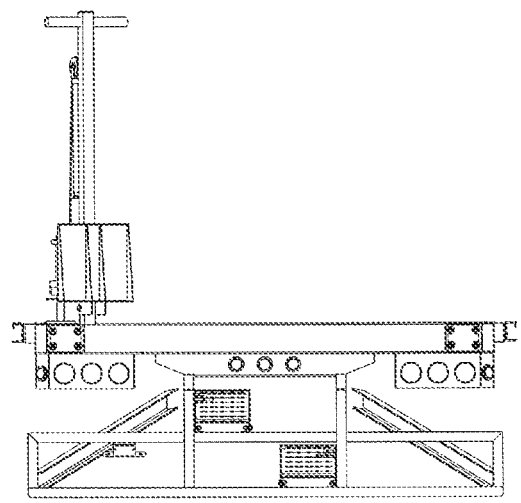
Figure 21C:
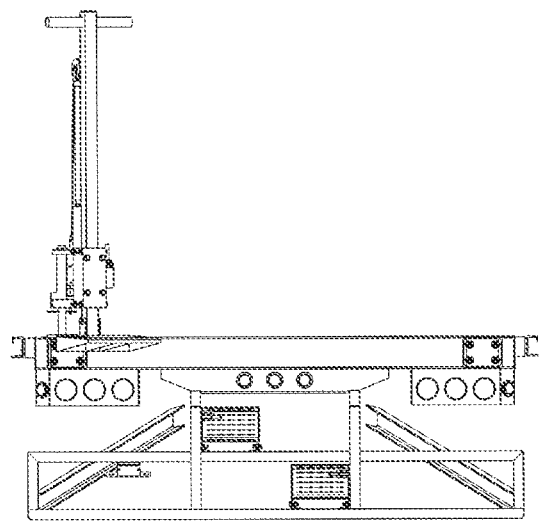
Figure 21D:
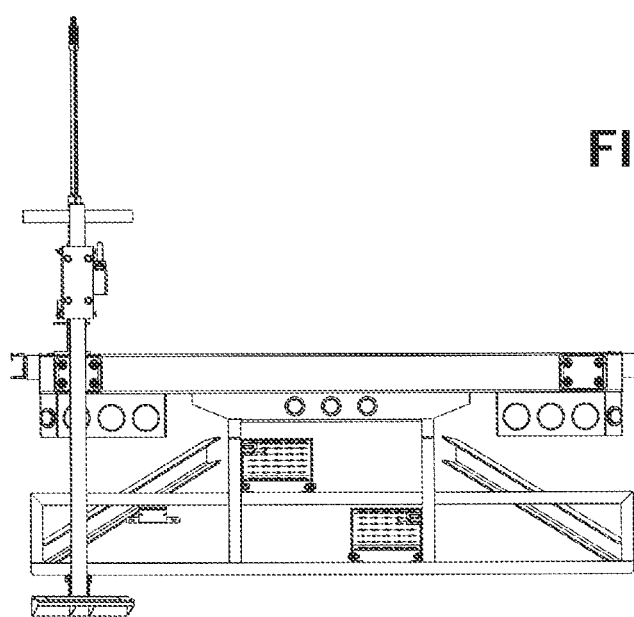

A comparison of FIGS. 19B and 19C shows how the platform may be pivotally adjusted from a vertically upright, storage position to a horizontally oriented use position. A comparison of FIGS. 19C and 19D shows how the platform may be selectively raised or lowered by the height-adjustment mechanism, to provide a user with easy access to, or egress from the interior of the trailer.

FIGS. 20A-20D, FIGS. 21A-21D, and FIGS. 22A-22D each show the same orientations of the elevation device 220, and steps in the use of the device, as FIGS. 19A-19D, and each of these groupings shows the device from a different angle to aid in understanding the present invention.

Fourth Embodiment

A fourth embodiment of a transportable personal elevation device 320 according to the present invention is shown in FIGS. 23A-23D, 24A-24D, 25A-25D, and 26A-26D.

In this fourth embodiment, a transportable powered personal elevator device 320 is provided for pivotal attachment to a trailer bed 250, or to another suitable vehicle surface, by placing a pivot pin 322 in a hollow support socket 323 provided on the trailer bed. The device 320 according to this fourth embodiment is supported on top of the trailer bed 250, as shown.

The powered personal elevator device 320 includes a platform assembly with a platform 325 for supporting a user thereon. The platform assembly also includes a platform support member 330 supporting the platform thereon. The platform 325 is pivotally attached to the platform support member 330 in such a way as to permit angular adjustment of the platform, and the platform support member also permits vertical adjustment of the platform so that it can be selectively raised and lowered.

In this embodiment, the platform support member 330 includes a support frame 332 and a vertically oriented platform support shaft 333 attached to the support frame, and being selectively movable in relation to the support frame. The platform support shaft 333 has a handle 334 attached to an upper end thereof, to permit grasping by a user.

The powered personal elevator device 320 according to the fourth embodiment also includes an electrically powered height-adjustment mechanism for selectively raising or lowering the support frame. Such height-adjustment mechanism is provided, in this embodiment, by a rotatable gear and screw assembly, including a threaded shaft disposed inside of the platform support shaft 333, and an internally threaded gear nut disposed inside of the support frame 332, capable of selectively raising or lowering the platform support shaft 333 by rotating around the threaded shaft.

Figure 23A:
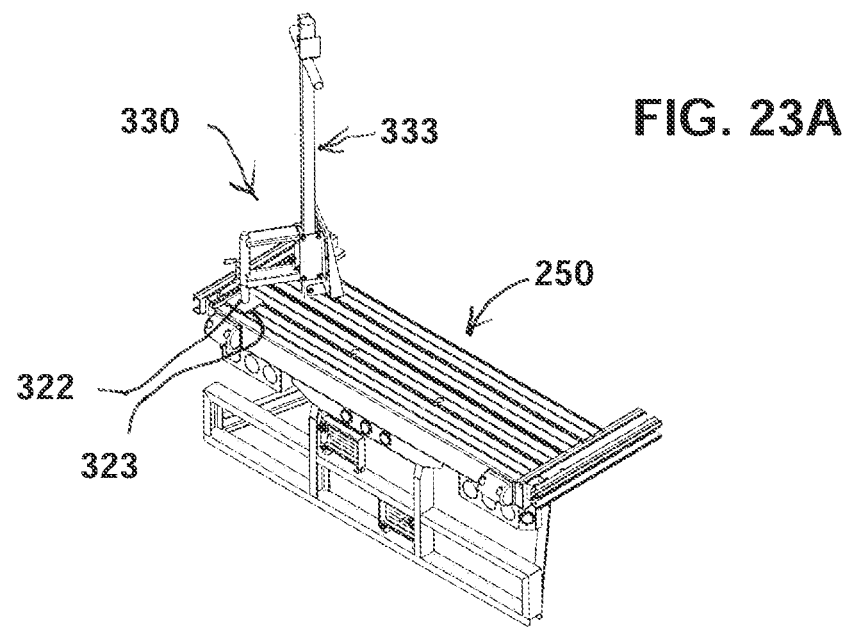
FIGS. 23A-23D are sequential perspective views of a rear portion of a semi truck trailer having a transportable personal elevation device according to a fourth embodiment of the present invention mounted thereon, where the sequence shows steps in operation of the device.

In FIG. 23A, the transportable personal elevation device 320 has been pivotally rotated inwardly about the pivot pin 322 to a storage position inside of the trailer bed 250.

Figure 23B:
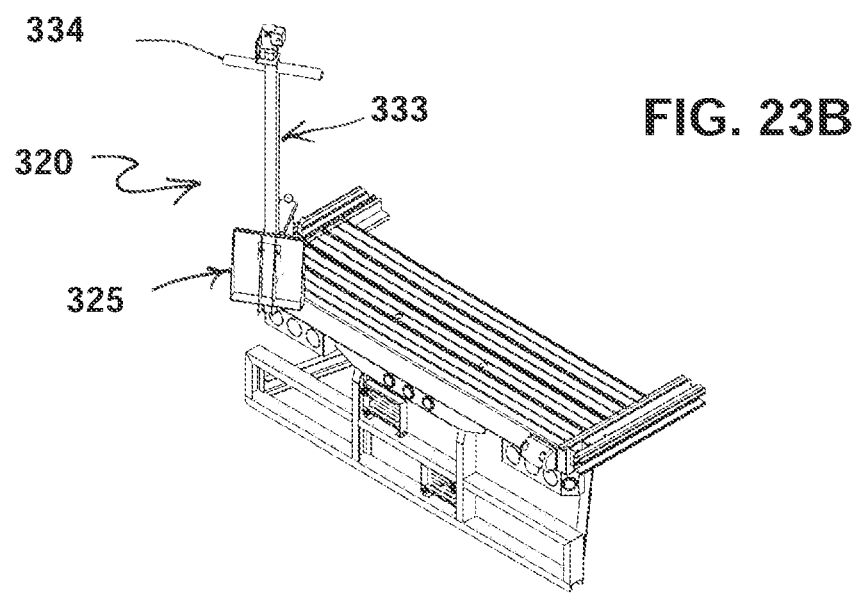

In FIG. 23B, the elevation device 320 has been pivotally rotated outwardly about the pivot pin 322 to a use position, where the platform 325 is disposed outside of the trailer bed 250.

As an alternative to the gear and screw assembly, a hydraulically actuated height-adjustment mechanism, including a hydraulic pump, may be used as part of the elevation device 320.

Figure 23C:
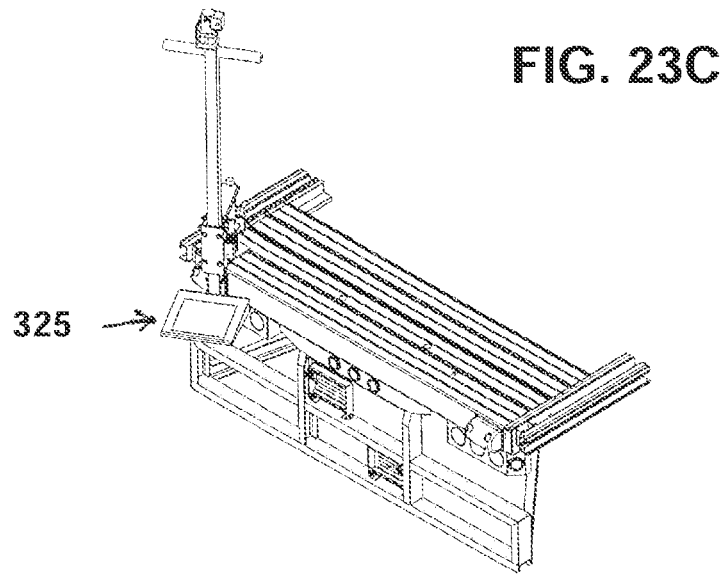

A comparison of FIGS. 23B and 23C shows how the platform may be pivotally angularly adjusted from a vertically upright, storage position to a horizontally oriented use position.

Figure 23D:
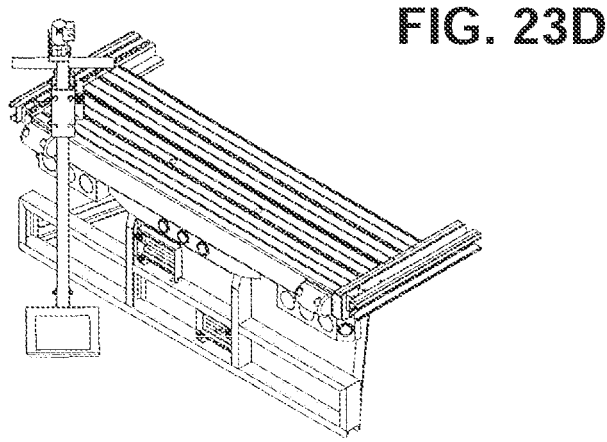
Figure 24A:
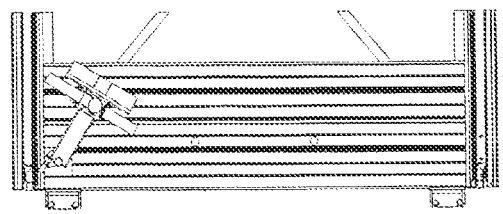
FIGS. 24A-24D are sequential top plan views of a rear portion of a semi truck trailer having the transportable personal elevation device according to the fourth embodiment of the present invention mounted thereon, where the sequence shows steps in operation of the device.
Figure 24B:
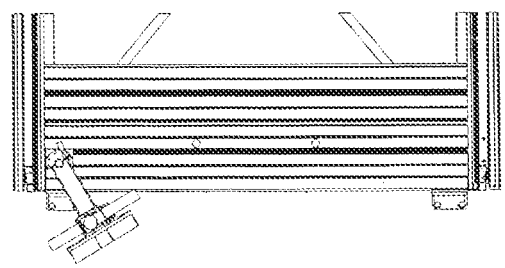
Figure 24C:
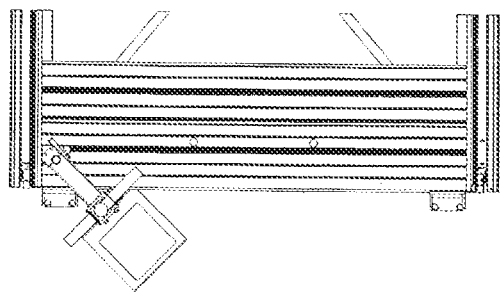
Figure 24D:
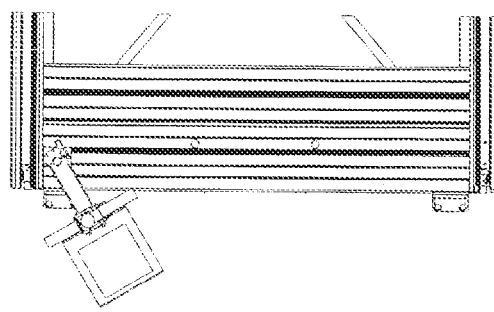
Figure 25A:
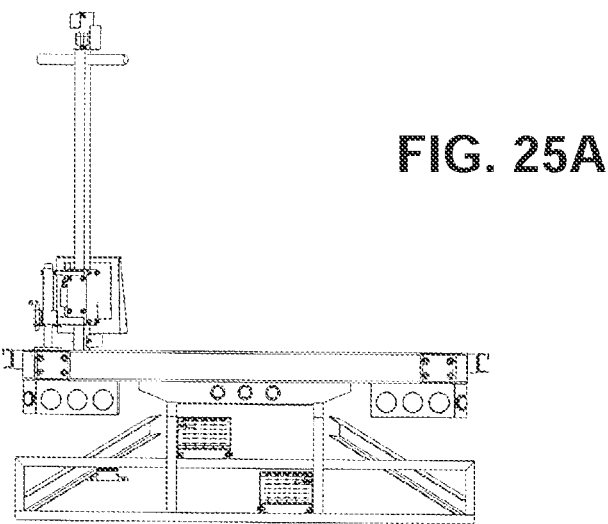
FIGS. 25A-25D are sequential rear plan views of a rear portion of a semi truck trailer having the transportable personal elevation device according to the fourth embodiment of the present invention mounted thereon, where the sequence shows steps in operation of the device.
Figure 25B:
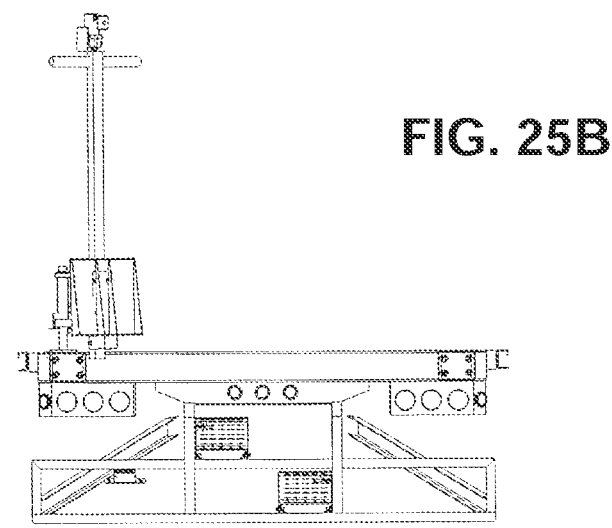
Figure 25C:
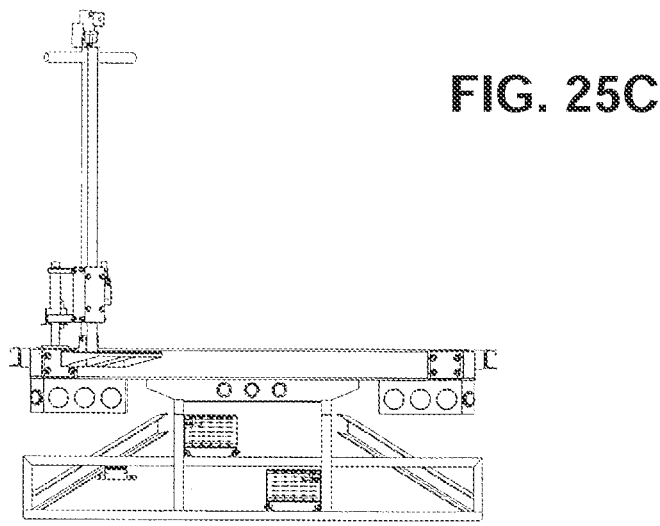
Figure 25D:
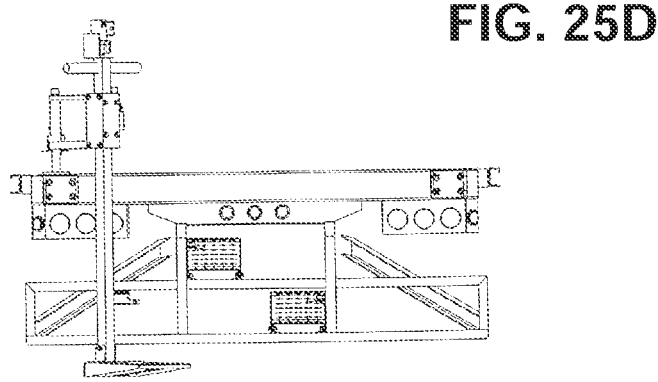
Figure 26A:
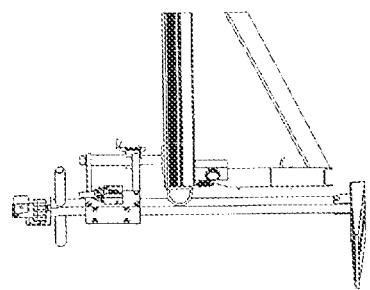
FIGS. 26A-26D are sequential side plan views of a rear portion of a semi truck trailer having the transportable personal elevation device according to the fourth embodiment of the present invention mounted thereon, where the sequence shows steps in operation of the device.
Figure 26B:
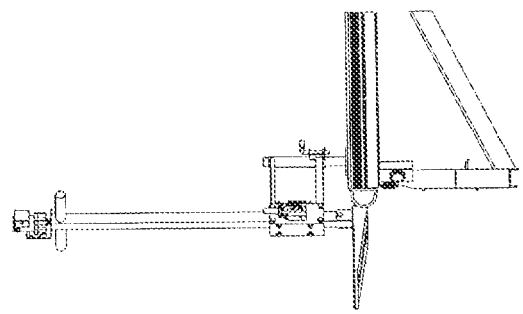
Figure 26C:
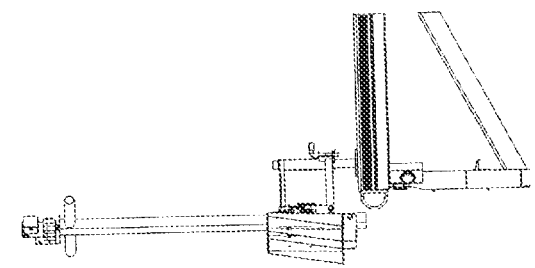
Figure 26D:
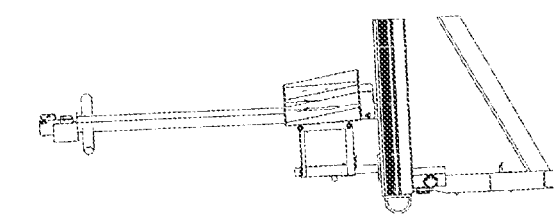

A comparison of FIGS. 23C and 23D shows how the platform may be selectively raised or lowered by the height-adjustment mechanism, to provide a user with easy access to, or egress from the interior of the trailer.

FIGS. 24A-24D, FIGS. 25A-25D, and FIGS. 26A-26D each show the same orientations of the elevation device 320, and steps in the use of the device, as FIGS. 23A-23D, and each of these groupings shows the device from a different angle to aid in understanding the present invention.

Modified Version of Fourth Embodiment

Figure 27:
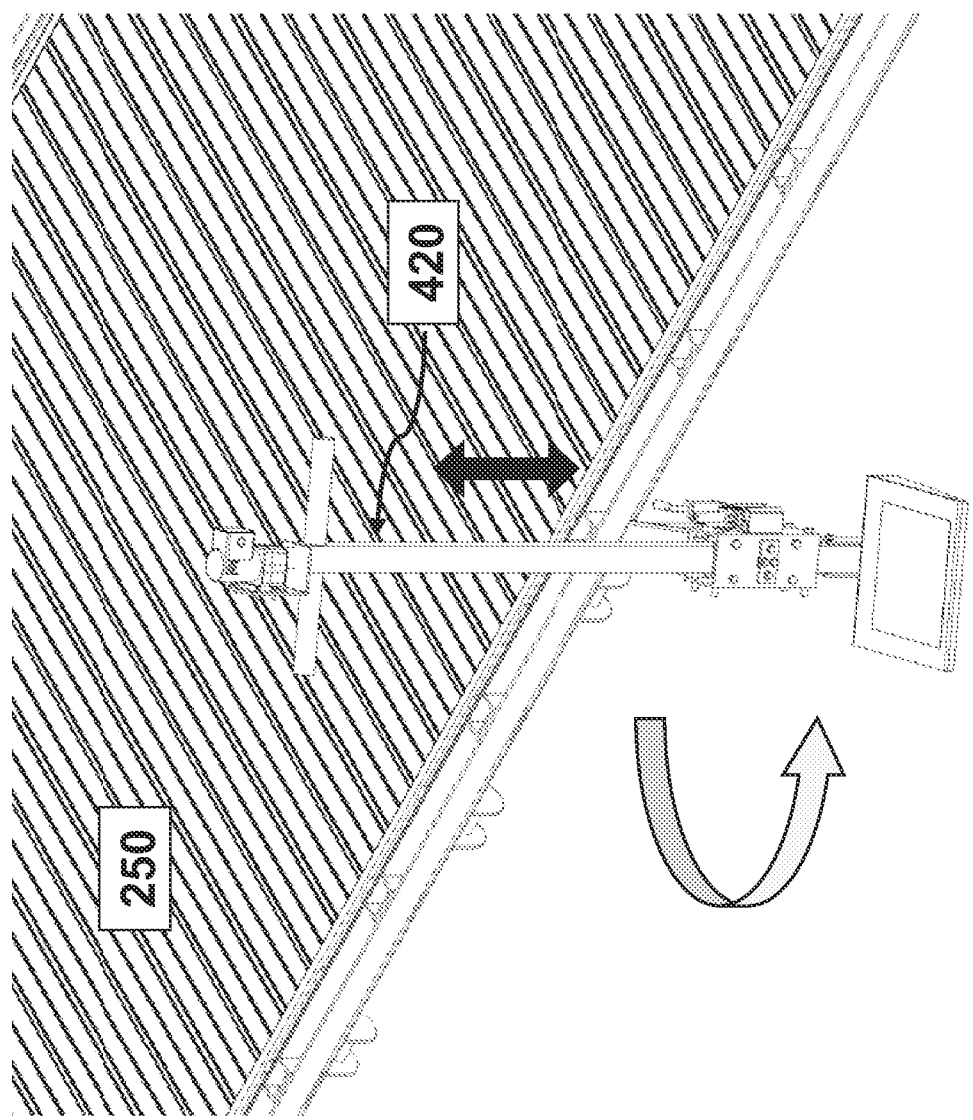
FIG. 27 is a perspective view of a rear portion of a semi truck trailer having a transportable personal elevation device according to a modified fourth embodiment of the present invention mounted thereon, where the device is capable of being stowed beneath a bed of the trailer.

FIG. 27 is a perspective view of a rear portion of a semi truck trailer having a transportable personal elevation device 420 according to a modified fourth embodiment of the present invention mounted thereon, where the device is capable of being stowed beneath a bed of the trailer.

In the modified version of the fourth embodiment shown in FIG. 27, the personal elevation device 420 may be placed entirely beneath the trailer or vehicle bed 250 when stored, and made to be pivotally movable out from beneath the bed 250, as shown. This arrangement leaves space within the trailer for holding cargo.

Fifth Embodiment

Figure 28A:
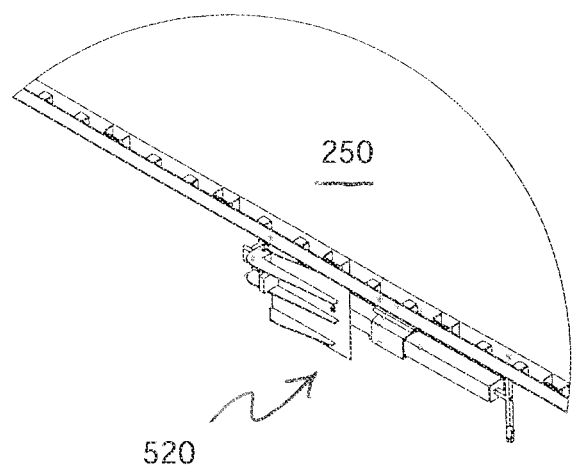
FIGS. 28A-28C are sequential perspective views of a rear portion of a semi truck trailer having a transportable personal elevation device according to a fifth embodiment of the present invention mounted thereon, where the device is capable of being stowed beneath a bed of the trailer, and where the sequence shows steps in operation of the device.
Figure 28B:
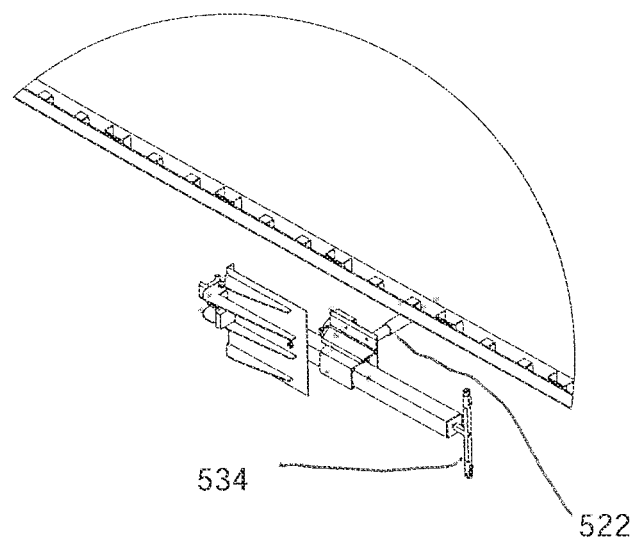
Figure 28C:
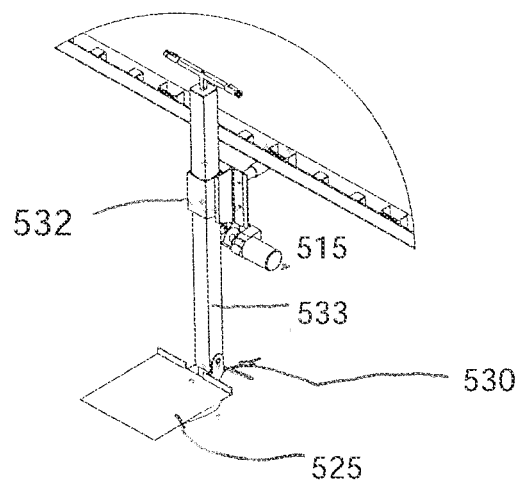
Figure 29A:
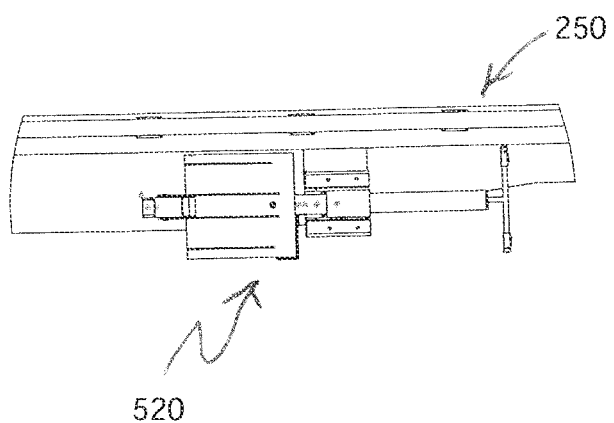
FIGS. 29A-29B are sequential side plan views of a rear portion of a semi truck trailer having the transportable personal elevation device according to the fifth embodiment of the present invention mounted thereon, where the sequence shows steps in operation of the device.
Figure 29B:
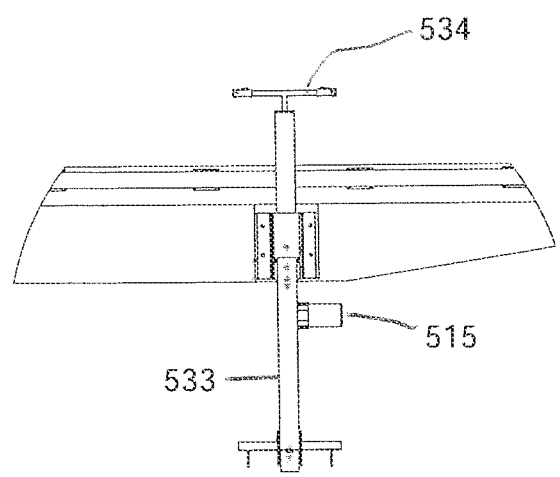
Figure 30A:
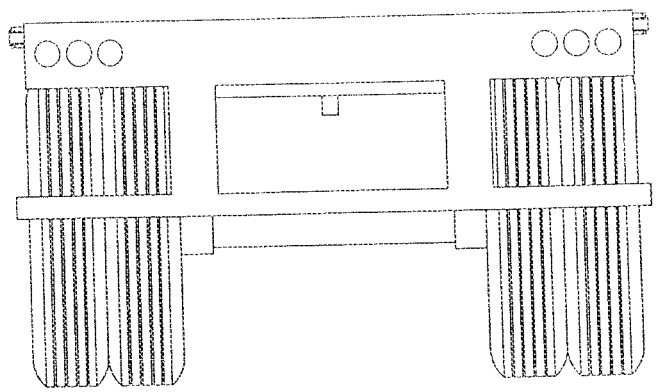
FIGS. 30A-30C are sequential rear plan views of a rear portion of a semi truck trailer having the transportable personal elevation device according to the fifth embodiment of the present invention mounted thereon, where the sequence shows steps in operation of the device.
Figure 30B:
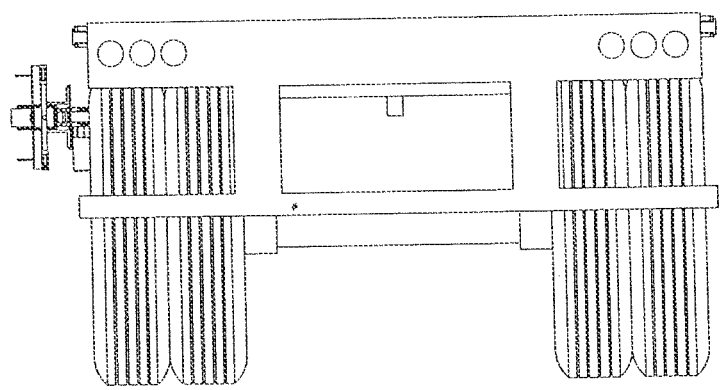
Figure 30C:
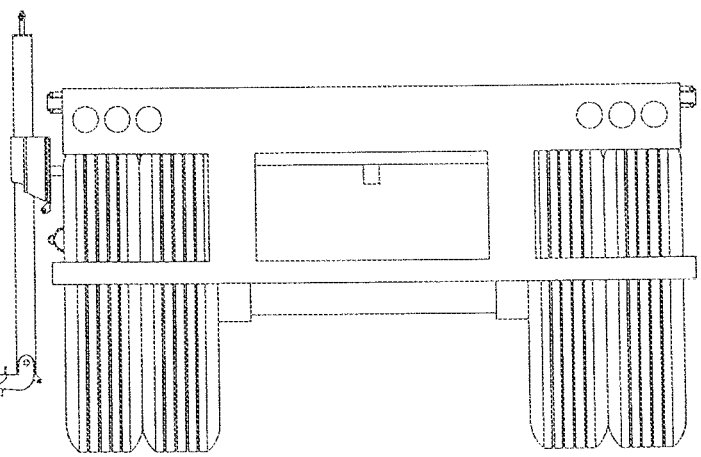

FIGS. 28A-28C are sequential perspective views of a rear portion of a semi truck trailer having a transportable personal elevation device according to a fifth embodiment of the present invention mounted thereon, where the device is capable of being stowed beneath a bed of the trailer, and where the sequence shows steps in operation of the device. FIGS. 29A-29B are sequential side plan views of a rear portion of a semi truck trailer having the transportable personal elevation device according to the fifth embodiment of the present invention mounted thereon, where the sequence shows steps in operation of the device. FIGS. 30A-30C are sequential rear plan views of a rear portion of a semi truck trailer having the transportable personal elevation device according to the fifth embodiment of the present invention mounted thereon, where the sequence shows steps in operation of the device.

In this fifth embodiment, a transportable powered personal elevator device 520 is provided for pivotal attachment below a side edge portion or a rear edge portion of a trailer bed 250, or another suitable vehicle surface, by mounting an extendable, retractable and pivotally rotatable pin member 522 in a suitable support structure provided below the trailer bed 250. The device 520 according to this fifth embodiment is supported on beneath the trailer bed 250, as shown.

The powered personal elevator device 520 includes a platform assembly with a platform 525 for supporting a user thereon. The platform assembly also includes a platform support member 530 supporting the platform thereon. The platform 525 is pivotally attached to the platform support member 530 in such a way as to permit angular adjustment of the platform, and the platform support member also permits vertical adjustment of the platform so that it can be selectively raised and lowered.

In this embodiment, the platform support member 530 includes a support frame 532 and a vertically oriented platform support shaft 533 attached to the support frame, and being selectively movable in relation to the support frame. The platform support shaft 533 has a handle 534 attached to an upper end thereof, to permit grasping by a user.

The powered personal elevator device 520 according to the fifth embodiment also includes an electrically or hydraulically powered height-adjustment mechanism for selectively raising or lowering the support frame. Such height-adjustment mechanism may be provided, in this embodiment, by a winch assembly capable of selectively raising or lowering the platform support shaft 533 by operating an electric motor 515 to move a cable.

In FIGS. 28A, 29A and 30A, the transportable personal elevation device 520 has been pivotally rotated inwardly about the pivot pin 522 and retracted to a storage position beneath the trailer bed 250.

In FIGS. 28B, and 30B, the elevation device 520 has been extended outwardly from beneath the trailer bed in preparation for movement to a use position.

In FIGS. 28C, 29B and 30C, the elevation device 520 has been pivotally rotated 90 degrees about the pivot pin 522 to a use position, where the platform 525 is disposed outside of the trailer bed 250.

As an alternative to the winch assembly, a hydraulically actuated height-adjustment mechanism, including a hydraulic pump, may be used as part of the elevation device 520.

A comparison of FIGS. 28B and 28C shows how the shaft 533 may be angularly adjusted from a horizontal storage position to a vertically oriented use position, and also shows how the platform 525 may be pivotally angularly adjusted from a folded flat storage position against the shaft, to a horizontally oriented use position.

Similar to that described above in connection with the third embodiment, the platform 525 in this fifth embodiment may be selectively raised or lowered by the height-adjustment mechanism, to provide a user with easy access to, or egress from the interior of the trailer.

FIG. 31A is a front plan view of a transportable personal elevation device 620 according to a sixth embodiment of the present invention. FIG. 31B is a side plan view of the transportable personal elevation device of FIG. 31A, also showing a portion of a semi truck trailer bed in phantom. FIG. 31C is a perspective view of the transportable personal elevation device of FIGS. 31A-31B, where the device mountable on an edge portion of a trailer bed 250.

In the sixth embodiment shown in FIGS. 31A-31C, the personal elevation device 620 may be removably attached to the edge portion of the trailer or vehicle bed 250. Other aspects of this sixth embodiment are similar to that described above in connection with the third and fourth embodiments. This arrangement also leaves space within the trailer for holding cargo.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

Having, thus, described the invention, what is claimed is:

1. A transportable personal elevation device for attaching to a movable substrate which is a vehicle or trailer bed, said elevation device comprising:
   a platform assembly including a platform and a platform support member supporting the platform thereon, the platform support member comprising:
   a support frame;
   a vertically oriented platform support shaft attached to the support frame and being selectively vertically movable in relation to the support frame;
   an electrically powered height-adjustment mechanism for selectively raising or lowering the support frame; and
   a connector assembly for operatively connecting the platform assembly to the substrate, the connector assembly comprising a pivot pin and a mounting structure;
   wherein the connector assembly is configured and arranged such that when the personal elevation device is attached to the substrate, the personal elevation device can be pivotally moved about the pivot pin between a storage position and an outwardly extending position.

2. The transportable personal elevation device of claim 1, wherein the platform support shaft has at least one handle attached thereto proximate an upper end thereof.

3. The transportable personal elevation device of claim 1, wherein the height-adjustment mechanism comprises a motor.

4. The transportable personal elevation device of claim 1, wherein the height-adjustment mechanism comprises a winch assembly comprising a pulley, a cable and a spool.

5. The transportable personal elevation device of claim 1, wherein the height-adjustment mechanism comprises a hydraulic pump.

6. The transportable personal elevation device of claim 1, wherein the height-adjustment mechanism comprises a threaded shaft disposed inside of the platform support shaft, and a rotatable gear nut which receives a portion of the threaded shaft therein.

7. The transportable personal elevation device of claim 1, wherein the device is configured to be stowable beneath the bed when installed thereon, and to be pivotally movable between a stored position and a use position.

\* \* \* \* \*